(12) United States Patent
Kobayashi et al.

(10) Patent No.: US 8,930,112 B2
(45) Date of Patent: Jan. 6, 2015

(54) VEHICLE BRAKE HYDRAULIC PRESSURE CONTROL APPARATUS

(71) Applicant: Nissin Kogyo Co., Ltd., Nagano (JP)

(72) Inventors: Masashi Kobayashi, Nagano (JP); Tomonori Hirose, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 13/724,707

(22) Filed: Dec. 21, 2012

(65) Prior Publication Data

US 2013/0184955 A1    Jul. 18, 2013

(30) Foreign Application Priority Data

Dec. 26, 2011 (JP) ................. 2011-283937
Jan. 25, 2012 (JP) ................. 2012-013181
Feb. 17, 2012 (JP) ................. 2012-032402

(51) Int. Cl.
*B60T 8/1764* (2006.01)
*B60T 8/1755* (2006.01)
*B60T 7/12* (2006.01)

(52) U.S. Cl.
CPC .......... *B60T 8/0764* (2013.01); *B60T 8/1755* (2013.01); *B60T 7/12* (2013.01)
USPC ............................................. 701/72

(58) Field of Classification Search
CPC ........ B60T 8/1764; B60T 8/1755; B60T 7/12
USPC ........... 701/72, 73, 70, 71, 74; 303/146, 147, 303/148, 149, 150
See application file for complete search history.

(56) References Cited

U.S. PATENT DOCUMENTS 5,863,105 A * 1/1999 Sano ..................... 303/146
6,325,469 B1 * 12/2001 Carson et al. ............ 303/140

(Continued)

FOREIGN PATENT DOCUMENTS

JP    11129884    5/1999
JP    2001294144  10/2001

(Continued)

OTHER PUBLICATIONS

U.S. Appl. No. 13/724,716, filed Dec. 21, 2012, not yet published.

(Continued)

*Primary Examiner* — John Q Nguyen
*Assistant Examiner* — Nadeem Odeh
(74) *Attorney, Agent, or Firm* — Andrew M. Calderon; Robert Mlotkowski Safran & Cole, P.C.

(57) ABSTRACT

A vehicle brake hydraulic pressure control apparatus includes a hydraulic pressure adjusting unit, a split road determining section, a differential pressure control section, and a hydraulic pressure adjusting and driving section. The hydraulic pressure adjusting unit individually adjusts brake fluid pressures acting on wheel brakes for wheels. The split road determining section determines whether road surfaces which the wheels are in contact with constitute a split road. In a state where the split road determining section determines during execution of antilock braking control that the road surfaces constitute the split road, the differential pressure control section determines command pressures for the wheel brakes so that differential pressures between the brake fluid pressures of the right and left wheel brakes are equal to or less than a permissible differential pressure. The hydraulic pressure adjusting and driving section controls the hydraulic pressure adjusting unit based on the determined command pressures.

19 Claims, 19 Drawing Sheets

(56) References Cited

U.S. PATENT DOCUMENTS

2006/0122760 A1* 6/2006 Terasaka .................... 701/73
2007/0029875 A1 2/2007 Kurosaki et al.
2012/0193889 A1* 8/2012 Harrison ................... 280/423.1

FOREIGN PATENT DOCUMENTS

| | | |
|---|---|---|
| JP | 2004231124 | 8/2004 |
| JP | 2006137285 | 6/2006 |
| JP | 200755583 A | 3/2007 |
| JP | 2010111176 | 5/2010 |

OTHER PUBLICATIONS

Japanese Office Action for related application 2012-032402 dated Dec. 17, 2013, 7 pages.

* cited by examiner

Duration of differential pressure control

Estimated velocity of vehicle body

VEHICLE BRAKE HYDRAULIC PRESSURE CONTROL APPARATUS

CROSS REFERENCE TO RELATED APPLICATION

This application is based on and claims priority under 35 U.S.C. §119 to Japanese Patent Application Nos. 2011-283937 (filed on Dec. 26, 2011), 2012-13181 (filed on Jan. 25, 2012), and 2012-32402 (filed on Feb. 17, 2012), the entire contents of which are incorporated herein by reference.

BACKGROUND

1. Technical Field

The invention relates to a vehicle brake hydraulic pressure control apparatus.

2. Description of the Related Art

JP 2007-55583 A discloses a vehicle brake hydraulic pressure control apparatus that executes antilock braking control for wheel brakes for left and right front wheels and left and right rear wheels of a vehicle independently from each other. In this vehicle brake hydraulic pressure control apparatus, it is controlled so that a difference between brake fluid pressures of the right and left wheel brakes does not become equal to or larger than a predetermined value on a split road in which coefficients of friction of road surfaces which the left and right wheels of the vehicle are in contact are largely different from each other.

SUMMARY

In such a vehicle brake hydraulic pressure control apparatus, there may be a case where a permissible differential pressure which is permitted between brake fluid pressures of the right and left wheel brakes is determined according to a drop amount of a wheel speed on a high coefficient-of-friction side as shown in FIG. 7. When the drop amount of the wheel speed on the high coefficient-of-friction side since a start of the antilock braking control becomes equal to or larger than a predetermined value ($\alpha$ in FIG. 7), the permissible differential pressure is increased according to the drop amount of the wheel speed on the high efficient-of-friction side. Thereby, suppression of the differential pressure in an initial stage of the differential pressure control and increase of the differential pressure thereafter are realized.

In this case, a wheel speed on the high coefficient-of-friction side ($\mu$ high side) decreases moderately as shown in FIG. 8 when a brake operation member such as a brake pedal is operated at slow speeds. Therefore, a time period $\Delta T1$ from a time at which the antilock braking control is started to a time at which the drop amount of the wheel speed reaches the predetermined value a becomes relatively long. In contrast to this, when the brake operation member is operated at high speeds, as shown in FIG. 9, a wheel speed on the high coefficient-of-friction side (the high $\mu$ side) decreases faster than that indicated by a chain double-dashed line for the case where the brake operation member is operated at slow speeds. A time period $\Delta T2$ from the time at which the antilock braking control is started to the time the drop amount of the wheel speed reaches the predetermined value $\alpha$ becomes relatively short. Therefore, a time variation ($\Delta T1-\Delta T2$) in timing at which the suppression of the differential pressure is shifted to the expansion thereof, which results in a driver having physical disorder feeling.

One embodiment of the invention has been made in view of these circumstances and provides a vehicle brake hydraulic pressure control apparatus in which a timing at which a permissible differential pressure is increased during execution of the differential pressure control does not depend on a speed at which a brake operation member is operated so that a driver does not have physical disorder feeling.

(1) A vehicle brake hydraulic pressure control apparatus includes a hydraulic pressure adjusting unit, a split road determining section, a differential pressure control section, and a hydraulic pressure adjusting and driving section. The hydraulic pressure adjusting unit individually adjusts brake fluid pressures acting on wheel brakes for right and left front wheels and right and left rear wheels. The split road determining section determines as to whether or not road surfaces which the right wheels and the left wheels are in contact with constitute a split road in which coefficients of friction of the road surfaces are different from each other. In a state where the split road determining section determines during execution of antilock braking control that the road surfaces constitute the split road, the differential pressure control section determines command pressures for the right and left wheel brakes so that differential pressures between the brake fluid pressures of the right and left wheel brakes are equal to or less than a permissible differential pressure. The hydraulic pressure adjusting and driving section controls the hydraulic pressure adjusting unit based on the command pressures determined by the differential pressure control section. The differential pressure control section sets a permissible differential pressure from start of differential pressure control until elapse of a first predetermined time period to be smaller than that after the elapse of the first predetermined time period.

With the configuration described above, the permissible differential pressure is increased at a point in time at which the first predetermined time period has elapsed since the differential pressure control is started. Therefore, the timing at which the permissible differential pressure is increased is determined based on the time period, which elapses since the differential pressure control is started without depending on the speed at which the brake operation member is operated. As a result, it is possible to realize a stable differential pressure control which can prevent the driver from having the physical disorder feeling.

(2) The vehicle brake hydraulic pressure control apparatus of (1) may further include a vehicle body velocity acquiring section that acquires a velocity of a vehicle body. The differential pressure control section may set the permissible differential pressure from the start of the differential pressure control until the elapse of the first predetermined time period, based on the velocity of the vehicle body acquired by the vehicle body velocity acquiring section.

With the configuration described above, the differential pressure control is executed based on the permissible differential pressure, which is set according to the velocity of the vehicle body until the first predetermined time period elapses since the differential pressure control is started. Therefore, uneasiness feeling can be eliminated from the driver, thereby making it possible to ensure the stability in the initial stage of the differential pressure control.

(3) The vehicle brake hydraulic pressure control apparatus of (1) may further include a vehicle body velocity acquiring section that acquires a velocity of a vehicle body. The differential pressure control section may set the permissible differential pressure from the start of the differential pressure control until the elapse of the first predetermined time period so that the permissible differential pressure increases as the velocity of the vehicle body acquired by the vehicle body velocity acquiring section decreases.

(4) In the vehicle brake hydraulic pressure control apparatus of any one of (2) and (3), the differential pressure control section may search for the permissible differential pressure from the start of the differential pressure control until the elapse of the first predetermined time period, based on a map in which the permissible differential pressure is determined in response to the velocity of the vehicle body in advance.

With the configuration described above, the permissible differential pressure is retrieved based on the map in which the permissible differential pressure is determined in accordance with the velocity of the vehicle body in advance. Thereby, the permissible pressure can be set easily.

(5) The vehicle brake hydraulic pressure control apparatus of any one of (1) to (4) may further include a steering angle sensor that detects a steering angle, and a yaw rate sensor that detects a yaw rate of a vehicle. The differential pressure control section may set the permissible differential pressure after the elapse of the first predetermined time period since the start of the differential pressure control, based on the steering angle detected by the steering angle sensor and the yaw rate detected by the yaw rate sensor.

With the configuration described above, the permissible differential pressure is set based on the steering angle and the yaw rate after the first predetermined time period has elapsed since the differential pressure control is started. Therefore, the differential pressure can be controlled as required according to the behaviors of the vehicle, thereby making it possible to enhance the stability.

(6) The vehicle brake hydraulic pressure control apparatus of any one of (1) to (5) may further include an antilock braking control section. The antilock braking control section determines as to whether or not executing the antilock braking control. The antilock braking control section calculates a hydraulic pressure control amount during the execution of the antilock braking control. In the state where the split road determining section determines that the road surfaces constitute the split road, the differential pressure control section may calculate the differential pressures between the brake fluid pressures of the right and left wheel brakes. The hydraulic pressure adjusting and driving section may control the hydraulic pressure adjusting unit based on the hydraulic pressure control amount calculated by the antilock braking control section and the differential pressures calculated by the differential pressure control section. If the brake fluid pressure of the wheel brake, among the wheel brakes for the right and left front wheels, being located on a higher coefficient-of-friction road side at a time when the differential pressure control between the wheel brakes for the right and left front wheels is started decreases in association with the antilock braking control after the differential pressure control is started, the differential pressure control section may determine the brake fluid pressure of the wheel brake on the higher coefficient-of-friction road side at a time when the decrease of the brake fluid pressure is started, to be the command pressure for the wheel brake on the higher coefficient-of-friction road side. The differential pressure control section may continue to output the determined command pressure for the wheel brake on the higher coefficient-of-friction road side for a second predetermined time period. The hydraulic pressure adjusting and driving section may control the hydraulic pressure adjusting unit so that the brake fluid pressure of the wheel brake on the higher coefficient-of-friction road side becomes the determined command pressure for the wheel brake on the higher coefficient-of-friction road side.

With the configuration described above, when the brake fluid pressure of the wheel brake for the front wheel, which was on the high μ side at a time when the differential pressure control was started, is started to be reduced due to the antilock braking control after the differential pressure control is started, the state in which the command pressure is set to the brake fluid pressure, which is exhibited when the brake fluid pressure is started to be reduced, is held for the predetermined time period, while the command pressure is set to the brake fluid pressure of the wheel brake for the front wheel which is on the high μ side. Therefore, the quick and drastic change in brake fluid pressure that would otherwise result from the antilock braking control can be avoided. That is, the change in brake fluid pressure can be suppressed. As a result, it is possible to suppress the vehicle body from being pitched or swayed.

(7) In the vehicle brake hydraulic pressure control apparatus of (6), after the second predetermined time period has been elapsed since the decrease of the brake fluid pressure by the antilock braking control is started after the differential pressure control is started, the differential pressure control section may correct the command pressure for the wheel brake on the higher coefficient-of-friction road side based on a command pressure correction amount so as to increase the command pressure for the wheel brake on the higher coefficient-of-friction road side.

With the configuration described above, even in the event that the command pressure is set to a lower brake fluid pressure, which is lower than the lock hydraulic pressure at which the antilock braking control is expected to be executed on the high μ, road, due to that the pressure reduction associated with the antilock braking control is started by a temporary change in coefficient of friction on the road surface caused such as a case where the wheel brake for the front wheel on the high μ, side passes over irregularities or a cover of a manhole on the road surface after the differential pressure control is started, the command pressure is corrected so as to be increased based on the command pressure correction amount after the second predetermined time period has elapsed since the start of the reduction in brake fluid pressure. Therefore, it is possible to ensure the braking force.

(8) In the vehicle brake hydraulic pressure control apparatus of (6), after the second predetermined time period has been elapsed since the decrease of the brake fluid pressure is started after the differential pressure control is started, the differential pressure control section may correct the command pressure for the wheel brake on the higher coefficient-of-friction road side by adding a command pressure correction amount to a current command pressure for the wheel brake on the higher coefficient-of-friction road side.

(9) In the vehicle brake hydraulic pressure control apparatus of any one of (7) and (8), the command pressure correction amount may be set so as to subsequently increase with time after the second predetermined time period has been elapsed.

With the configuration described above, the command pressure correction amount is set so as to increase sequentially with time. Therefore, the brake fluid pressure can be restored to the lock hydraulic pressure at which the antilock braking control is started on the high μ road, thereby making it possible to ensure the braking force.

(10) The vehicle brake hydraulic pressure control apparatus of any one of (1) to (9) may further include a master cylinder, a pressure sensor, and a correction reference value setting section. The master cylinder outputs a hydraulic pressure in response to an operation amount of a brake pedal by a driver. The pressure sensor detects the output pressure of the master cylinder. The correction reference value setting section sets a correction reference value based on the detected value by the pressure sensor. In the state where the split road determining section determines during the execution of the antilock braking control that the road surfaces constitute the split road, the differential pressure control section may calculate the differential pressures between the brake fluid pressures of the right and left wheel brakes so that the brake fluid pressure of each wheel brake on a higher coefficient-of-friction road side is larger than that of the corresponding wheel brake on a lower coefficient-of-friction road side. If the differential pressure control section determines based on the detected value by the pressure sensor that a further depression operation is performed for the brake pedal, the differential pressure control section may add a part of an amount by which the output pressure of the master cylinder detected by the pressure sensor exceeds the correction reference value set by the correction reference value setting section to command pressures, in a non-further depression operation state, for the wheel brakes on the higher coefficient-of-friction road side and may determine brake fluid pressures obtained by the adding to be the command pressures, in a further depression operation state, for the wheel brakes on the higher coefficient-of-friction road side.

With the configuration described above, if it is recognized, based on the change in detection value of the pressure sensor during the execution of the differential pressure control, that the further depression operation is performed for the brake pedal, the differential pressure control section adds the part of the amount by which the detection value of the pressure sensor exceeds the correction reference value to the command pressure for the brake fluid pressure of the wheel brake on the high coefficient-of-friction side in the non-further depression operation state and determines the brake fluid pressure obtained by the adding to be the command pressure in the further depression operation state. Therefore, the braking force can be increased by increasing the brake fluid pressure of the wheel brake on the high coefficient-of-friction side as the brake pedal is further depressed. As a result, it is possible to prevent the driver from having the physical disorder feeling.

(11) In the vehicle brake hydraulic pressure control apparatus of (10), the correction reference value setting section may perform a filter process for the detected value by the pressure sensor and may set the correction reference value by adding an offset value to a value obtained by the filter process.

With the configuration described above, the correction reference value is set by applying the filter process to the detection value of the pressure sensor and by adding the offset value to the value obtained by the filter process. Thereby, the brake hydraulic pressure is not increased unless the detection value of the pressure sensor changes largely to some extent towards the pressure increasing side. As a result, no additional depression correction is executed unless the driver holds a strong intention to apply the brakes.

DETAILED DESCRIPTION

Hereinafter, embodiments of the invention will be described in detail with reference to the accompanying drawings.

First Embodiment

Figure 1:
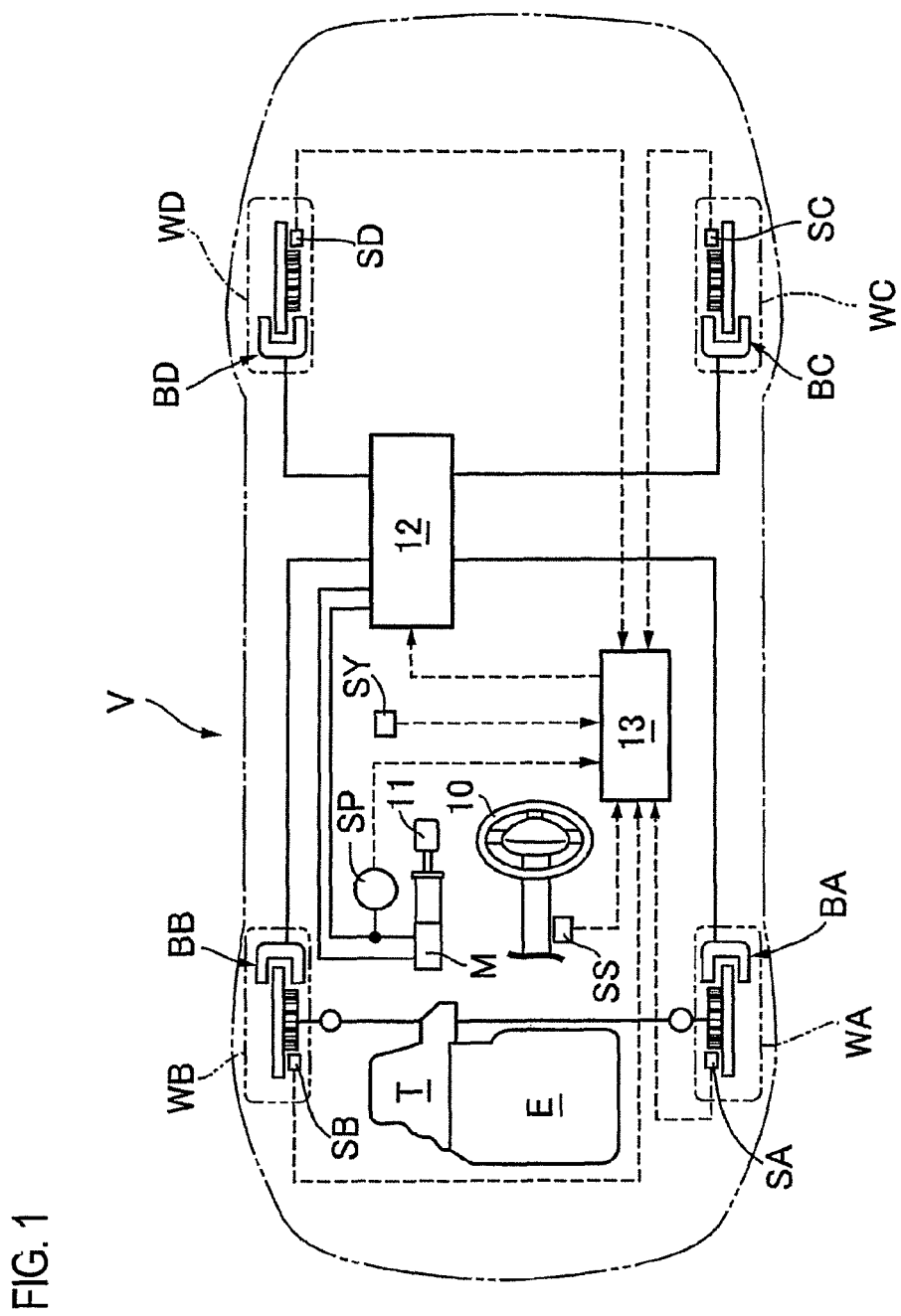
FIG. 1 is a diagram showing a brake hydraulic pressure control system of a vehicle according to first to third embodiments.

A first embodiment will be described with reference to FIG. 1 to FIG. 6. In FIG. 1, a vehicle V includes right and left front wheels WA, WB to which a driving force of an engine E is transmitted via a transmission T, and right and left rear wheels WC, WD. A brake pedal 11 (an example of a brake operation member) is operated by a driver and is connected to a master cylinder M. Also, wheel brakes BA, BB, BC, BD, which are operated by the action of brake fluid, are provided in the front wheels WA, WB and the rear wheels WC, WD, respectively. The master cylinder M is connected to the individual wheel brakes BA to BD via a hydraulic pressure adjusting unit 12. The hydraulic pressure adjusting unit 12 can adjust (can increase or decrease) the brake fluid pressures acting on the wheel brakes BA to BD individually in order to prevent the wheels from being locked during braking.

The operation of the hydraulic pressure adjusting unit 12 is controlled by a hydraulic pressure control apparatus 13. Signals from wheel speed sensors SA, SB, SC, SD which are provided individually for the right and left front wheels WA, WB and the right and left rear wheels WC, WD, a signal from a pressure sensor SP that detects a brake fluid pressure output from the master cylinder M, a signal from a steering angle sensor SS that detects a steering angle caused by an operation of a steering handle 10, and a signal from a yaw rate sensor SY that detects a yaw rate of the vehicle are input into the hydraulic pressure control apparatus 13. The hydraulic pressure control apparatus 13 controls the operation of the hydraulic pressure adjusting unit 12 based on the signals from the respective sensors SA to SD, SP, SS, SY.

It is noted that the steering angle sensor SS and the yaw rate sensor SY may be omitted. In such a case, the hydraulic pressure control apparatus 13 controls the operation of the hydraulic pressure adjusting unit based on the signals from the respective sensors SA to SD, SP.

Figure 2:
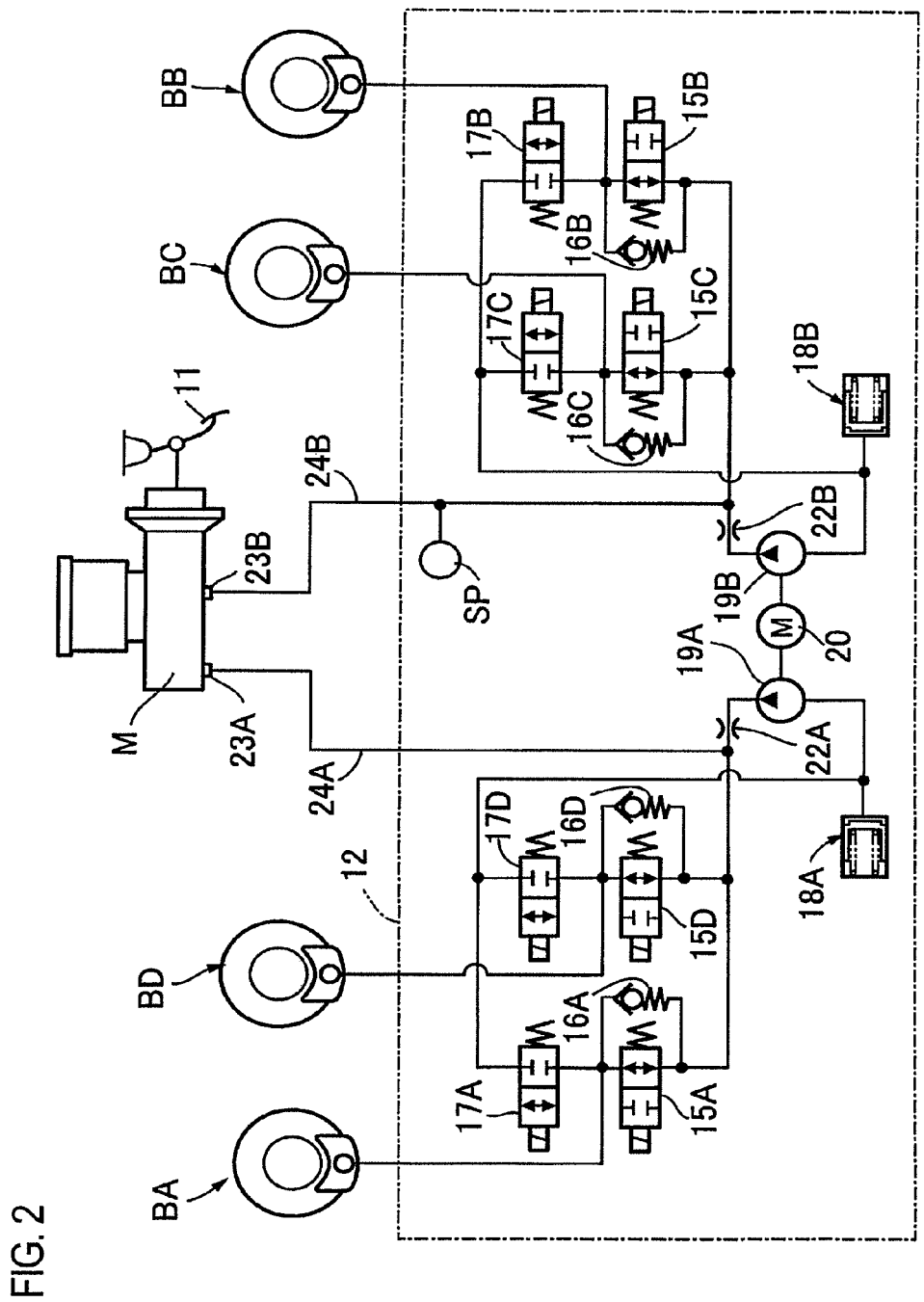
FIG. 2 is a hydraulic pressure circuit diagram showing the configuration of a hydraulic pressure adjusting unit according to the first to third embodiments.

In FIG. 2, the hydraulic pressure adjusting unit 12 includes normally open solenoid valves 15A to 15D, check valves 16A to 16D, normally closed solenoid valves 17A to 17D, a first reservoir 18A, a second reservoir 18B, a first pump 19A, a second pump 19B, an electric motor 20, a first orifice 22A, and a second orifice 22B. The normally open solenoid valves 15A to 15D correspond to the wheel brake BA for the left front wheel WA, the wheel brake BB for the right front wheel WB, the wheel brake BC for the left rear wheel WC, and the right rear wheel WD for the left rear wheel WC, respectively. The check valves 16A to 16D are connected in parallel to the normally open solenoid valves 15A to 15D, respectively. The normally closed solenoid valves 17A to 17D correspond to the wheel brakes BA to BD, respectively. Of first and second output ports 23A, 23B which are provided on the master cylinder M, the first reservoir 18A corresponds to a first output hydraulic pressure line 24A which continues to the first output port 23A. The second reservoir 18B corresponds to a second output hydraulic pressure line 24B which continues to the second output port 23B of the master cylinder M. Suction sides of the first and second pumps 19A, 19B are connected to the first and second reservoirs 18A, 18B, respectively. Discharge sides of the first and second pumps 19A, 19B are connected to the first and second output hydraulic pressure lines 24A, 24B, respectively. The electric motor 20 is shared by the first and second pumps 19A, 19B and drives the first and second pumps 19A, 19B. The first and second orifices 22A, 22B are provided between the discharge sides of the first and second pumps 19A, 19B and the master cylinder M, respectively. The pressure sensor SP is provided on one of the first and second hydraulic pressure lines 24A, 24B. For example, in FIG. 2, the pressure sensor SP is connected to the second output hydraulic pressure line 24B.

The normally open solenoid valves 15A, 15D are provided between the first output hydraulic pressure line 24A and the wheel brake BA for the left front wheel WA and between the first output hydraulic pressure line 24A and the wheel brake BD for the right rear wheel WD, respectively. The normally open solenoid valves 15B, 15C are provided between the second output hydraulic pressure line 24B and the wheel brake BB for the right front wheel WB and the second output hydraulic pressure line 24B and the wheel brake BC for the left rear wheel WC, respectively.

Also, the check valves 16A to 16D are connected in parallel to the corresponding normally open solenoid valves 15A to 15D, respectively, so as to allow the brake fluid to flow from the corresponding wheel brakes BA to BD to the master cylinder M.

The normally closed solenoid valves 17A, 17D are provided between the wheel brake BA for the left front wheel WA and the first reservoir 18A and between the wheel brake BD for the right rear wheel WD and the first reservoir 18A, respectively. The normally closed solenoid valves 17B, 17C are provided between the wheel brake BB for the right front wheel WB and the second reservoir 18B and between the wheel brake BC for the left rear wheel WC and the second reservoir 18B, respectively.

In the hydraulic pressure adjusting unit 12 configured as described above, under a normal braking operation where there is no possibility that each wheel is locked, communications are established between the master cylinder M and the wheel brakes BA to BD, while communications between the wheel brakes BA to BD and the first and second reservoirs 18A, 18B are cut off. That is, the normally open solenoid valves 15A to 15D are demagnetized to be opened, while the normally closed solenoid valves 17A to 17B are demagnetized to be closed. A brake fluid pressure output from the first output port 23A of the master cylinder M is applied to the wheel brake BA for the left front wheel WA via the normally open solenoid valve 15A and is also applied to the wheel brake BD for the right rear wheel WD via the normally open solenoid valve 15D. Also, a brake fluid pressure output from the second output port 23B of the master cylinder M is applied to the wheel brake BB for the right front wheel WB via the normally open solenoid valve 15B and is also applied to the wheel brake BC for the left rear wheel WC via the normally open solenoid valve 15C.

When any of the wheels is about to lock up under the normal braking operation, antilock braking control is executed. That is, the hydraulic pressure adjusting unit 12 cuts off the communications between the master cylinder M and the wheel brakes BA to BD at a portion which corresponds to the wheel which is about to lock up, while the hydraulic pressure adjusting unit 12 establishes the communications between the wheel brakes BA to BD and the reservoirs 18A, 18B. That is, the normally open solenoid valve of the normally open solenoid valves 15A to 15D which corresponds to the wheel which is about to lock up is magnetized to be closed, while the normally closed solenoid valve of the normally closed solenoid valves 17A to 17D which corresponds to the wheel which is about to lock up is magnetized to be opened. Thereby, a part of the brake fluid pressure for the wheel which is about to lock up is absorbed by the first reservoir 18A or the second reservoir 18B, and the brake fluid pressure for the wheel which is about to lock up is reduced.

In addition, when holding the brake fluid pressure at a constant level, the hydraulic pressure adjusting unit 12 isolates the wheel brakes BA to BD from the master cylinder M and the reservoirs 18A, 18B. That is, the normally open solenoid valves 15A to 15D are magnetized to be closed, while the normally closed solenoid valves 17A to 17D are demagnetized to be closed. Furthermore, when the brake fluid pressure(s) are increased, the normally open solenoid valves 15A to 15D are demagnetized to be opened, while the normally closed solenoid valves 17A to 17D are demagnetized to be closed.

By controlling the demagnetization/magnetization of the respective normally open solenoid valves 15A to 15D and the respective normally closed solenoid valves 17A to 17D in the way described above, it is possible to brake the vehicle with good efficiency without any of the wheels locking up.

Meanwhile, during the antilock braking control, the electric motor 20 rotates to operate, and the first and second pumps 19A, 19B are driven in association with the operation of the electric motor 20. Therefore, the brake fluid absorbed by the first and second reservoirs 18A, 18B is suctioned into the first and second pumps 19A, 19B. Then, the brake fluid so suctioned in is refluxed to the first and second output hydraulic pressure lines 24A, 24B. By the reflux of the brake fluid in this way, the brake fluid can be returned to the master cylinder M side. Moreover, the pulsation of discharge pressures of the first and second pumps 19A, 19B is suppressed by the action of the first and second orifices 22A, 22B. Therefore, the operation feeling of the brake pedal 11 is adversely affected by the reflux of the brake fluid.

Figure 3:
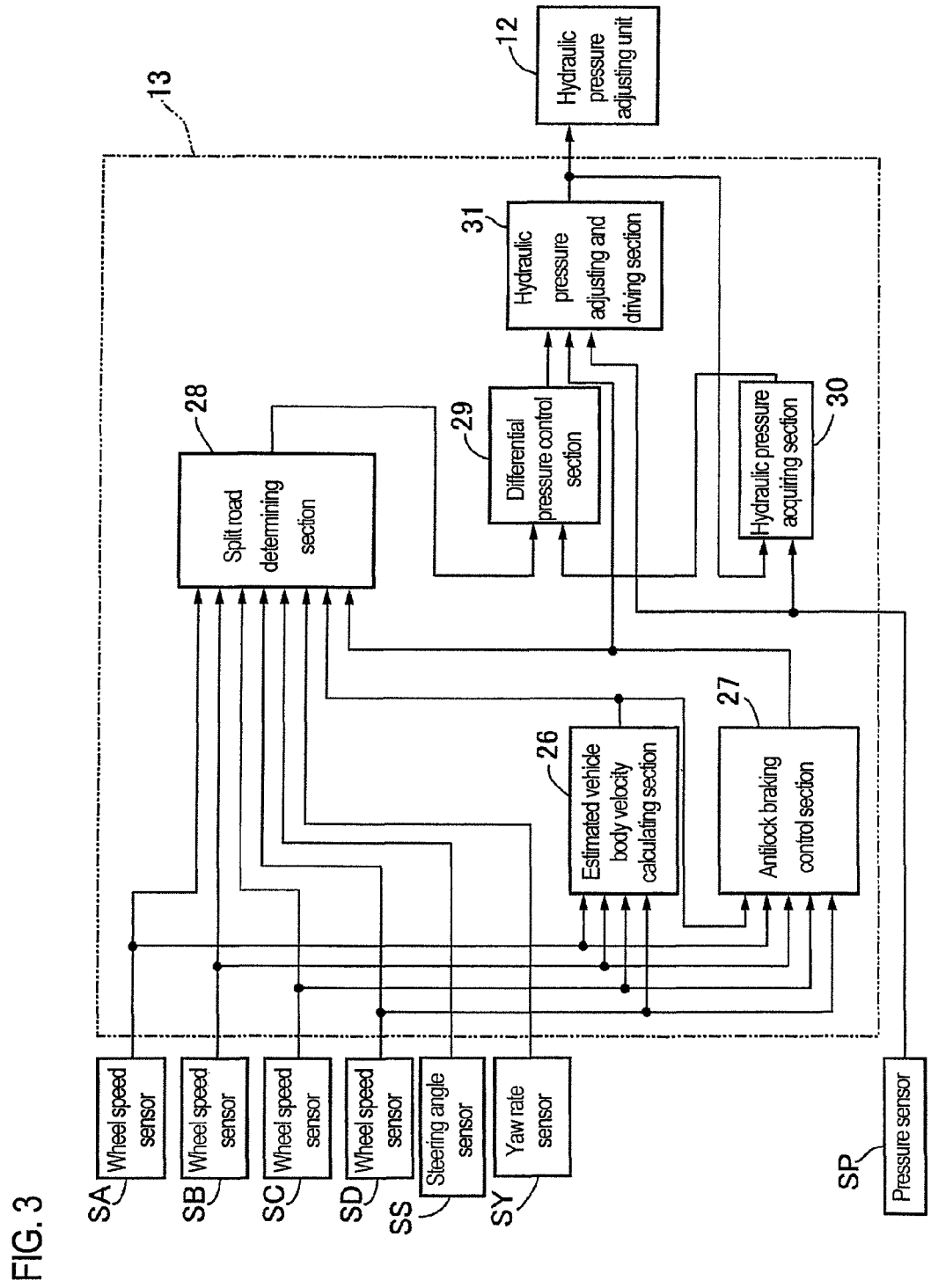
FIG. 3 is a block diagram showing the configuration of a vehicle brake hydraulic pressure control apparatus according to the first and second embodiments.
Figure 4:
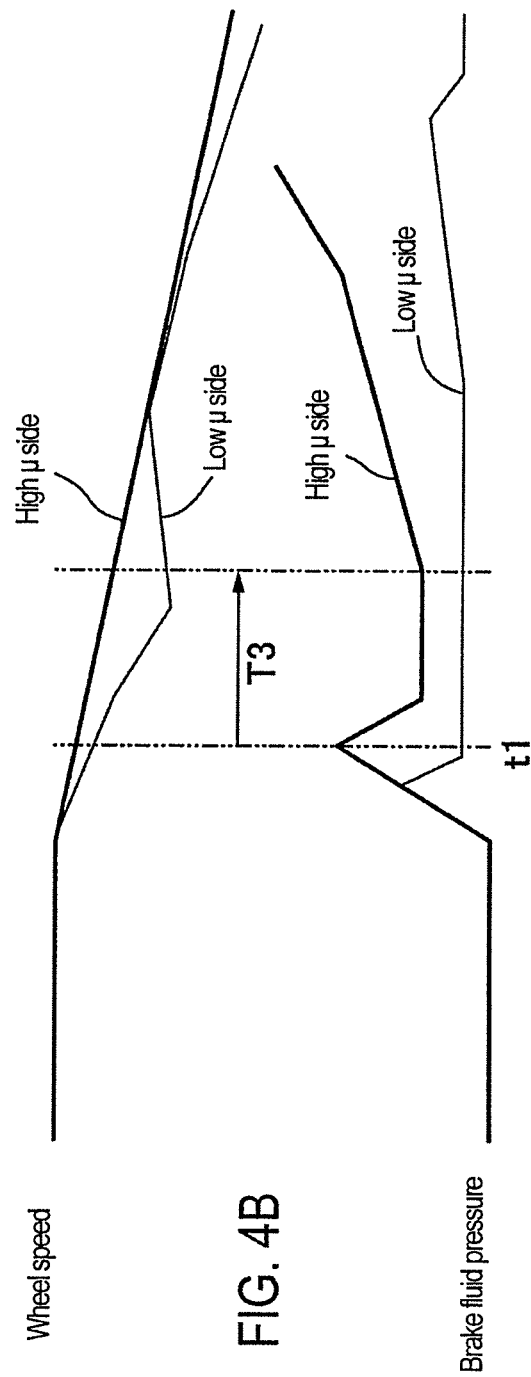
FIG. 4A is a diagram showing changes of wheel speeds with time when a brake operation member is operated at slow speeds in the first embodiment.
FIG. 4B is a diagram showing changes of brake fluid pressures with time when the brake operation member is operated at slow speeds in the first embodiment.
Figure 5:
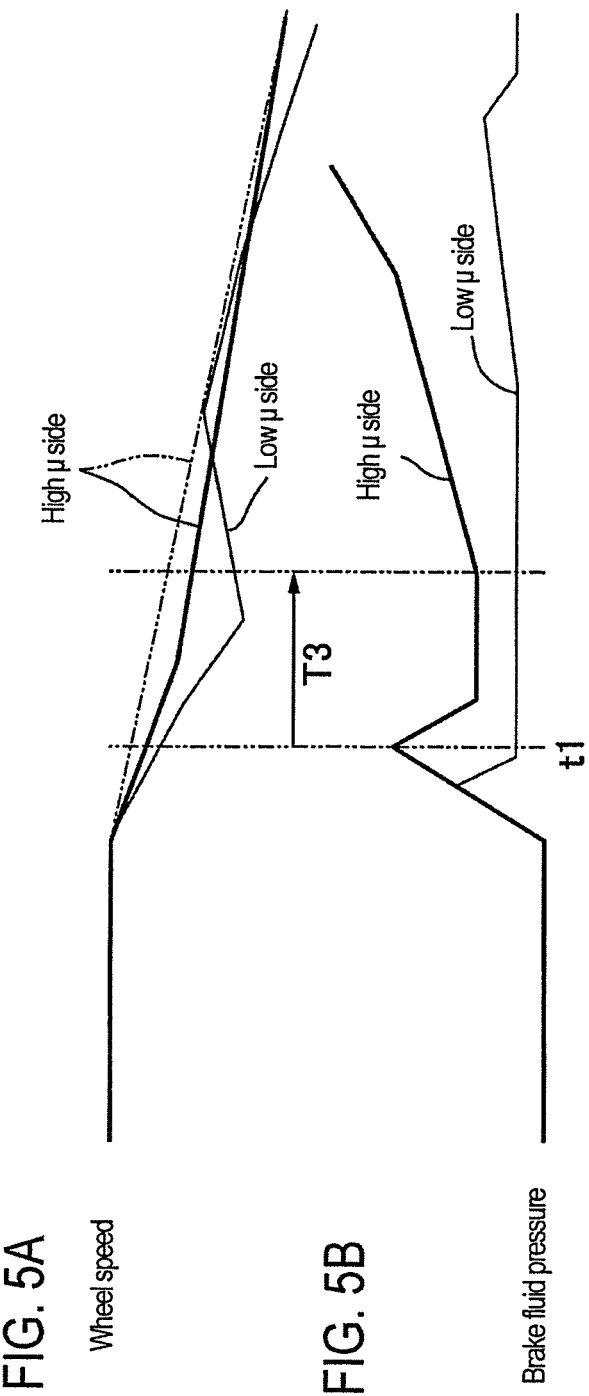
FIG. 5A is a diagram showing changes of wheel speeds with time when the brake operation member is operated at high speeds in the first embodiment.
FIG. 5B is a diagram showing changes of brake fluid pressures with time when the brake operation member is operated at high speeds in the first embodiment.

In FIG. 3, in addition to execution of the antilock braking control as described above, the hydraulic pressure control apparatus 13 which controls the operation of the hydraulic pressure adjusting unit 12 can execute differential pressure control to control so that a difference between the brake fluid pressures of the wheel brakes BA, BB for the right and left front wheels WA, WB and a difference between the brake fluid pressures of the wheel brakes BC, BD for the right and left rear wheels WC, WD to fall within a permissible differential pressure. The hydraulic pressure control apparatus 13 includes an estimated vehicle body velocity calculating section 26, an antilock braking control section 27, a split road determining section 28, a differential pressure control section 29, a hydraulic pressure acquiring section 30, and a hydraulic pressure adjusting and driving section 31. The estimated vehicle body velocity calculating section 26 is an example of a vehicle body velocity acquiring section. The antilock braking control section 27 determines as to whether or not the antilock braking control should be executed. Also, the antilock braking control section 27 calculates a hydraulic pressure control amount during the antilock braking control. The split road determining section 28 determines as to whether or not the road surfaces which the right and left wheels WA, AB; WC, WD are in contact with constitute a split road in which coefficients of friction of the right and left road surfaces are largely different from each other. The differential pressure control section 29 calculates the hydraulic pressure control amount by which the differential pressure control is executed which controls the difference between the brake fluid pressures of the wheel brakes BA, BB for the right and left front wheels WA, WB which are on the same axis and between the brake fluid pressures of the wheel brakes BC, BD for the right and left rear wheels WC, WD which are also on the same axis. The hydraulic pressure acquiring section 30 acquires the brake fluid pressures of the wheel brakes BA, BB for the front wheels WA, WB and the brake fluid pressures of the wheel brakes BC, BD for the rear wheels WC, WD. The hydraulic pressure adjusting and driving section 31 operates the hydraulic pressure adjusting unit 12.

The antilock braking control section 27 determines as to whether or not the antilock braking control should be executed, based on the wheel velocities acquired by the wheel speed sensors SA to SD and the estimated vehicle body velocity calculated by the estimated vehicle body velocity calculating section 26. Also, the antilock braking control section 27 calculates the hydraulic pressure control amount during the antilock braking control.

The split road determining section 28 determines as to whether or not road surfaces constitute the split road when the antilock braking control section 27 starts the antilock braking control for either of the front wheels WA, WB and the rear wheels WC, WD. For example, when the antilock braking control for at least one of the right and left front wheels WA, WB is started or when the antilock braking control for at least one of the right and left rear wheels WC, WD is started, the split road determining section 28 multiplies by −1 wheel speeds of the respective wheels WA to WD acquired by the wheel speed sensors SA to SD and calculates wheel decelerations of the respective wheels WA to WD based on the thus obtained values. Then, if a maximum value of the wheel decelerations of the wheels WA to WD (a wheel deceleration of the wheel which is the least decelerated; a wheel deceleration that is the closest to zero) is equal to or larger than a first predetermined value and if a difference between the wheel decelerations of the right and left front wheels WA, WB or right and left rear wheels WC, WD which are in an antilock braking control state is equal to or larger than a second predetermined value, the split road determining section 28 determines that the road surfaces constitute the split road.

The hydraulic pressure acquiring section 30 acquires the brake fluid pressures of the wheel brakes BA, BB for the front wheels WA, WB and the wheel brakes BC, BD for the rear wheels WC, WD based on an output hydraulic pressure of the master cylinder M and driving currents of the solenoid valves, which make up a part of the hydraulic pressure adjusting unit 12, that is, the normally open solenoid valves 15A to 15D and the normally closed solenoid valves 17A to 17D. The output hydraulic pressure of the master cylinder M is input from the pressure sensor SP to the hydraulic pressure acquiring section 30. Signals indicating the driving currents of the normally open solenoid valves 15A to 15D and the normally closed solenoid valves 17A to 17D are input from the hydraulic pressure adjusting and driving section 31 to the hydraulic pressure acquiring section 30.

When the split road determining section 28 determines that the road surfaces constitute the split road, the differential pressure control section 29 determines brake fluid pressures (command pressures for the wheel brakes BA, BB; BC, BD) based on the brake fluid pressures of the wheel brakes BA, BB, BC, BD, which are acquired by the hydraulic pressure acquiring section 30 and the velocity of the vehicle body acquired by the estimated vehicle body velocity calculating section 26, so that a difference between the brake fluid pressures of the wheel brakes BA, BB; BC, BD for the right and left wheels WA, WB; WC, WD, which are on the same axis, becomes equal to or smaller than the permissible differential pressure.

The differential pressure control section 29 may determine the brake fluid pressures (command pressures for the wheel brakes BA, BB; BC, BD) based on the steering angle detected by the steering angle sensor SS and the yaw rate detected by the yaw rate sensor SY in addition to the brake fluid pressures of the wheel brakes BA to BD and the velocity of the vehicle body so that a difference between the brake fluid pressures of the wheel brake BA for the front wheel WA and the wheel brake BB for the front wheel WB and a difference between the brake fluid pressures of the wheel brake BC for the rear wheel WC and the wheel brake BD for the rear wheel WD become equal to or smaller than the permissible differential pressure.

The hydraulic pressure adjusting and driving section 31 drives the hydraulic pressure adjusting unit 12 based on the output hydraulic pressure of the master cylinder M, which is detected by the pressure sensor SP, the results of the determination made by the antilock braking control section 27, the hydraulic pressure controlling amount calculated by the antilock braking control section 27, and the brake fluid pressures determined by the differential pressure control section 29.

The differential pressure control section 29 sets the permissible differential pressure which is exhibited until a first predetermined time T3 elapses since the differential pressure control is started to be smaller than the permissible differential pressure which is exhibited after the first predetermined time T3 has elapsed. When the brake pedal 11 is operated at slow speeds, the wheel speed on the high coefficient-of-friction (high μ) side and the wheel speed on the low coefficient-of-friction (low μ) side change as shown in FIG. 4A. At this time, the brake fluid pressure on the high coefficient-of-friction (high μ) side and the brake fluid pressure on the low coefficient-of-friction (low μ side change as shown in FIG. 4B. The differential pressure control is executed so that the difference between the brake fluid pressure on the high coefficient-of-friction (high μ) side and the brake fluid pressure on the low coefficient-of-friction (low μ) side is increased after the first predetermined time period T3 elapses since a time t1 at which the differential pressure control is started.

Also, when the brake pedal 11 is controlled at high speeds, the wheel speed on the high coefficient-of-friction (high μ) side and the wheel speed on the low coefficient-of-friction (low μ) side change as shown in FIG. 5A. At this time, the brake fluid pressure on the high coefficient-of-friction (high μ) side and the brake fluid pressure on the low coefficient-of-friction (low μ) side change as shown in FIG. 5B. The differential pressure control is executed so that the difference between the brake fluid pressure on the high coefficient-of-friction (high μ) side and the brake fluid pressure on the low coefficient-of-friction (low μ) side is increased after the first predetermined time period T3 elapses since the time t1 at which the differential pressure control is started.

That is, regardless of the operating speed of the brake pedal 11 and the operating amount of the brake pedal 11, the timing at which the difference between the brake fluid pressure on the high coefficient-of-friction (high μ) side and the brake fluid pressure on the low coefficient-of-friction (low μ) side is increased is a point in time when the first predetermined time period T3 elapses since the time t1 at which the differential pressure control is started. Therefore, regardless of the operating speed of the brake pedal 11 and the operating amount of the brake pedal 11, the timing at which the differential pressure is increased becomes the same.

Figure 6:
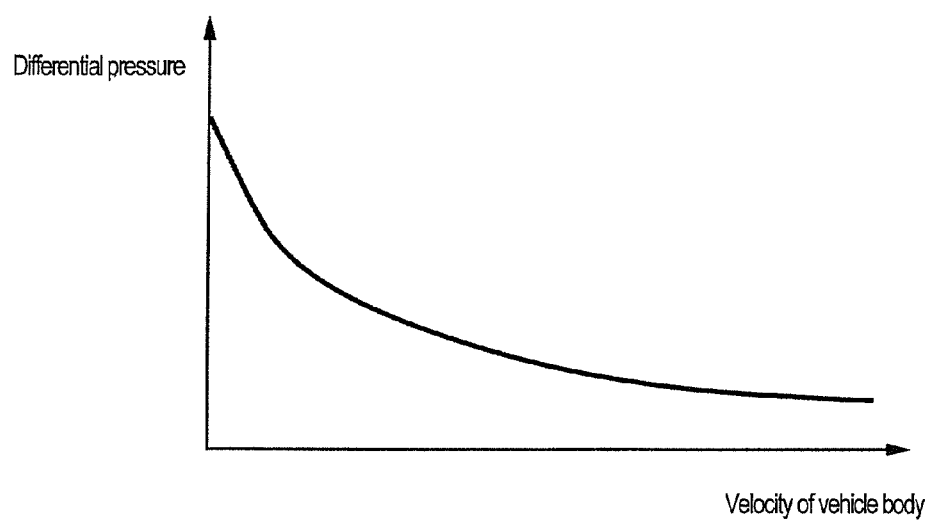
FIG. 6 is a diagram showing a map of a permissible differential pressure according to a velocity of a vehicle body.
Figure 7:
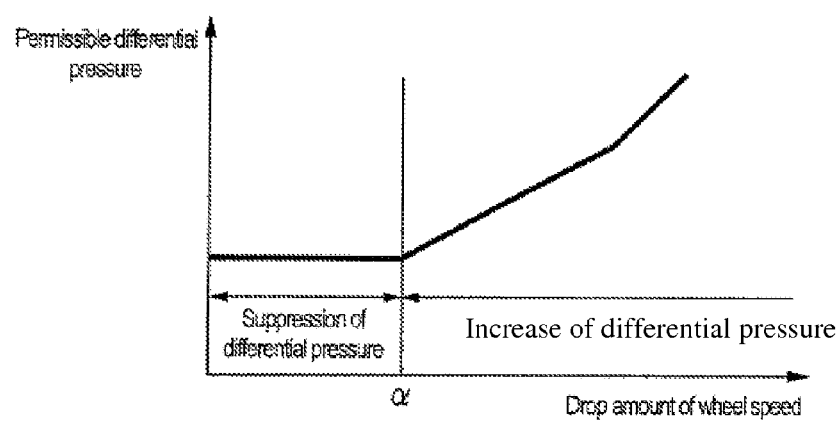
FIG. 7 is a diagram showing a relation between the permissible differential pressure and a drop amount of wheel speed when the permissible differential pressure is changed according to the drop amount of wheel speed.
Figure 8:
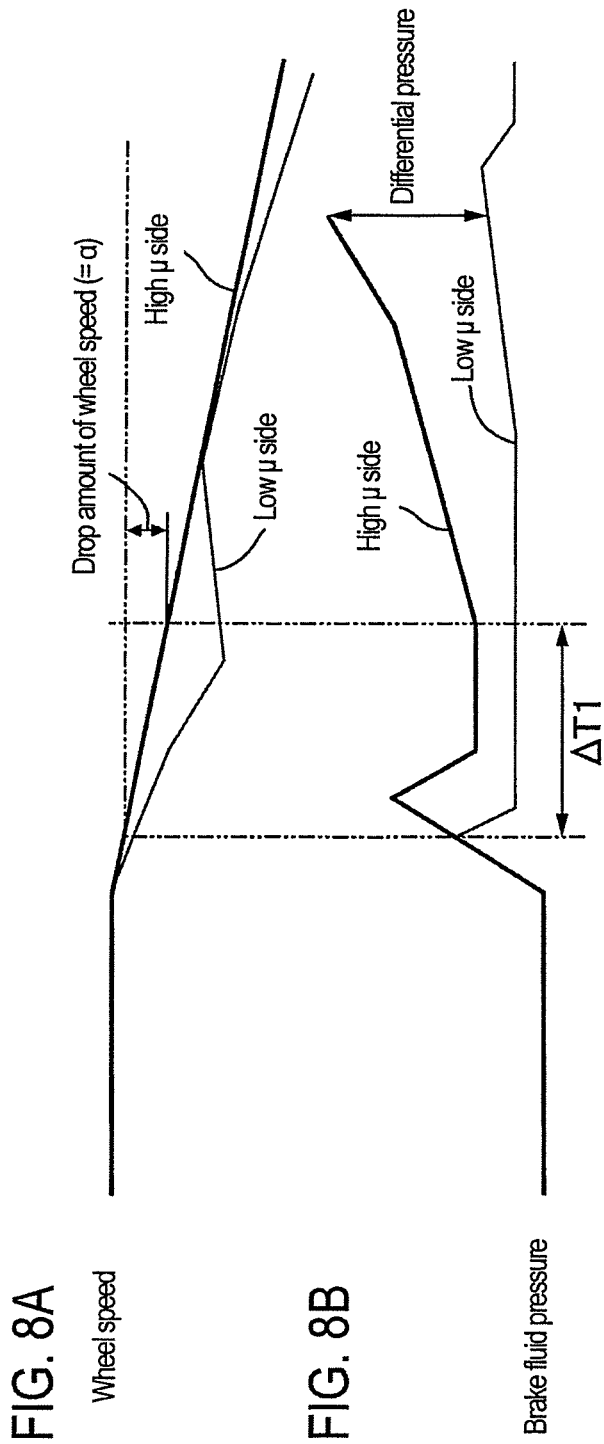
FIG. 8A is a diagram showing changes of the wheel speeds with time when the brake operation member is operated at slow speeds in the event that the permissible differential pressure is changed according to the drop amount of wheel speed.
FIG. 8B is a diagram showing changes of the brake fluid pressures with time when the brake operation member is operated at slow speeds in the event that the permissible differential pressure is changed according to the drop amount of wheel speed.
Figure 9:
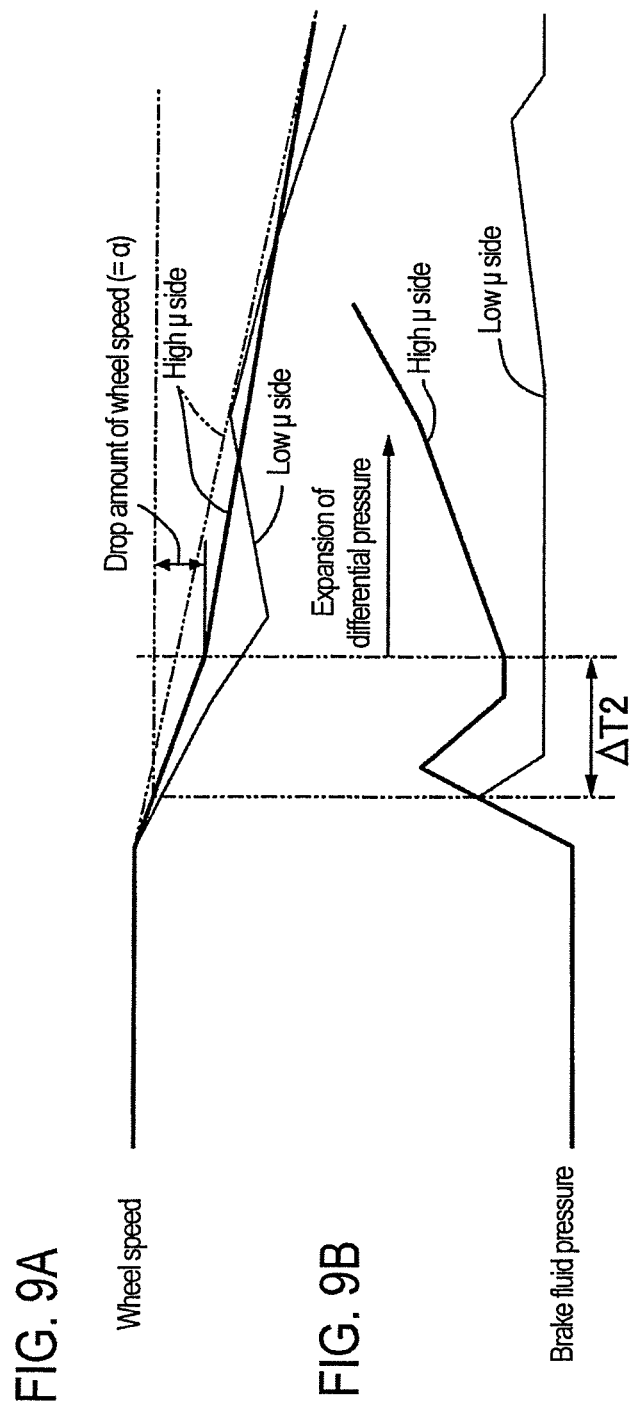
FIG. 9A is a diagram showing changes of the wheel speeds with time when the brake operation member is operated at high speeds in the event that the permissible differential pressure is change according to the drop amount of wheel speed.
FIG. 9B is a diagram showing changes of the brake fluid pressures with time when the brake operation member is operated at high speeds in the event that the permissible differential pressure is changed according to the drop amount of wheel speed.

The differential pressure control section 29 may determine the permissible differential pressure according to the velocity of the vehicle body, which is acquired by the estimated vehicle body velocity calculating section 26, until the first predetermined time period T3 elapses since the differential pressure control is started. More specifically, the differential pressure control section 29 may determine the permissible differential pressure so as to increase as the velocity of the vehicle body decreases which is acquired by the estimated vehicle body velocity calculating section 26 until the first predetermined time period T3 elapses since the differential pressure control is started. For example, as shown in FIG. 6, a map is prepared in advance in which the permissible differential pressure is determined according to the velocity of the vehicle body. The differential pressure control section 29 retrieves a permissible differential pressure until the first predetermined time period T3 elapses since the differential pressure control is started.

Also, detection values of the steering angle sensor SS, which detects the steering angle, and the yaw rate sensor SY, which detects the yaw rate of the vehicle, may be input to the differential pressure control section 29. The differential pressure control section 29 may determine the permissible differential pressure after the first predetermined time period T3 elapses since the differential pressure control is started, based on the detection values of the steering angle sensor SS and the yaw rate sensor SY.

Next, the effect of the first embodiment will be described. The differential pressure control section 29 sets the permissible differential pressure until the first predetermined time period T3 elapses since the differential pressure control is started, to be smaller than the permissible differential pressure after the first predetermined time period T3 elapses. Also, the differential pressure control section 29 determines the command pressures for the right and left wheel brakes (BA, BB; BC, BD) so as to be equal to or smaller than the thus-set permissible differential pressure. The hydraulic pressure adjusting and driving section 31 controls the operation of the hydraulic pressure adjusting unit 12 based on the determined command pressures. Therefore, during the differential pressure controlling, the permissible differential pressure is increased at the point in time at which the first predetermined time period T3 elapses since the differential pressure control is started. The timing at which the permissible differential pressure is increased is determined based on the time that elapses since the differential pressure control is started without depending on the operating speed of the brake pedal 11. As a result, the stable differential pressure control can be performed without the driver feel having physical disorder feeling.

Also, the differential pressure control section 29 may set the permissible differential pressure so that the permissible differential pressure increases as the velocity of the vehicle body decreases, which is acquired by the estimated vehicle body velocity calculating section 26 until the first predetermined time period T3 elapses since the differential pressure control is started. In this case, in the initial stage of the control until the first predetermined time period T3 elapses since the differential pressure control is started, the differential pressure control is executed based on the permissible differential pressure, which is set according to the velocity of the vehicle body. Therefore, it is possible to ensure the stability in the initial stage of the differential pressure control while eliminating driver's uneasiness feeling.

Furthermore, the differential pressure control section 29 may search for the permissible differential pressure until the first predetermined time period T3 elapses since the differential pressure control is started, based on the map in which the permissible differential pressure is determined in advance according to the velocity of the vehicle body. In this case, it becomes easy to set the permissible differential pressure.

Furthermore, the differential pressure control section 29 may set the permissible differential pressure after the first predetermined time period T3 elapses since the differential pressure control is started, based on the detection values of the steering angle sensor SS and the yaw rate sensor SY. In this case, it is possible to execute the differential pressure control appropriately in response to the behaviors of the vehicle, thereby making it possible to enhance the stability.

Second Embodiment

Next, a second embodiment will be described with reference to the accompanying drawings. It should be noted that in the following description, similar reference numerals will be assigned to members similar to those of the first embodiment, and the redundant description thereon will be omitted.

Figure 10:
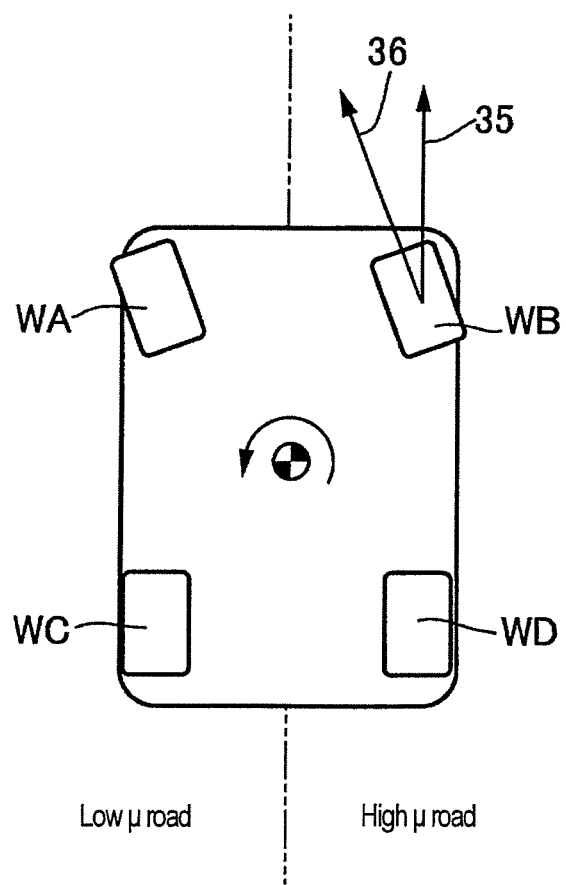
FIG. 10 is a diagram for explaining a running state of the vehicle.
Figure 11:
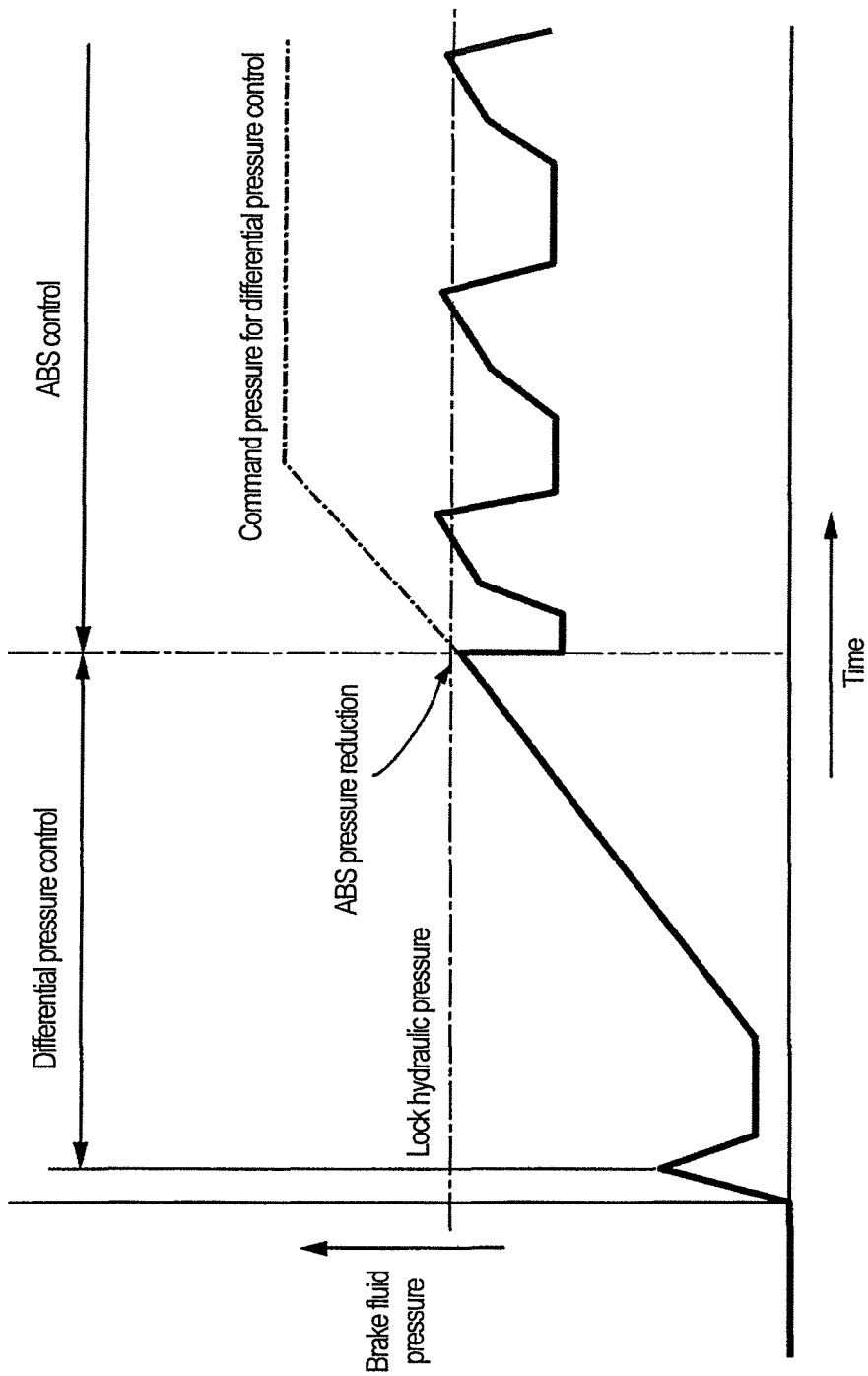
FIG. 11 is a diagram showing a change in brake fluid pressure of a wheel brake for a front wheel on a high μ side in a state where antilock braking control is kept being executed for the wheel brake for the front wheel on the high μ side after differential pressure control is started.

It is assumed that, as shown in FIG. 10, a vehicle V is running in a traveling direction indicated by an arrow 35 with left and right front wheels WA, WB and left and right rear wheels WC, WD being in contact with a low coefficient-of-friction (low μ) road surface and a high coefficient-of-friction (high μ) road surface, respectively (that is, the road surfaces constitute a split road). If a permissible differential pressure is set to be large which is used to execute a differential pressure control in response to the start of the antilock braking control for wheel brakes on the low μ road side, there may be a case where the vehicle brake hydraulic pressure control apparatus according to the first embodiment starts to execute the antilock braking control for wheel brakes on the high μ road side. In such a case, if the vehicle brake hydraulic pressure control apparatus continues the antilock braking control in a state where the left and right front wheels WA, WB are controlled so that the orientation 36 of the left and right front wheels WA, WB is inclined relative to the traveling direction 35, the wheels may slip abruptly or the restoration of the wheel speed may be delayed. This easily results in a state where the brake fluid pressures on the high μ road side repeat an increase and a decrease in an excessive fashion, as shown in FIG. 11, with the brake fluid pressures being equal to or less than command pressures (the brake fluid pressures, which are determined by the differential pressure control section 29) for differential pressure control. Then, the excessive repetition of increase and decrease in brake fluid pressure possibly causes pitching or swaying of the vehicle body.

A vehicle brake hydraulic pressure control apparatus according to the second embodiment is configured so as to suppress pitching or swaying of the vehicle body when the antilock braking control is started for the wheel brakes on the high μ road side after the differential pressure control is started.

In the second embodiment, in order to suppress pitching or swaying of the vehicle body when the antilock braking control is started for the wheel brake for the front wheel on the high μ road side after the differential pressure control is started, the differential pressure control section 29 operates as follows. That is, when the brake fluid pressure of the wheel brake on the high μ road side among the wheel brakes BA, BB for the left and right front wheels WA, WB is decreased during the execution of the differential pressure control between the wheel brakes BA, BB in association with the antilock braking control after the differential pressure control is started (for example, at a time t2 in FIG. 12), the differential pressure control section 29 determines the brake fluid pressure of the wheel brake on the high μ road side at a time when the decrease of the brake fluid pressure of the wheel brake is started to be a command pressure and continues to output the thus-determined command pressure over a second predetermined time period T4. On the other hand, when the brake fluid pressure of the wheel brake on the high μ road side among the wheel brakes BA, BB for the left and right front wheels WA, WB is decreased during the execution of the differential pressure control between the wheel brakes BA, BB in association with the antilock braking control after the differential pressure control is started (for example, at the time t2 in FIG. 12), the hydraulic pressure adjusting and driving section 31 drives the hydraulic pressure adjusting unit 12 so that the brake fluid pressure of the wheel brake the high μ road side becomes the command pressure, which is set by the differential pressure control section 29.

Figure 12:
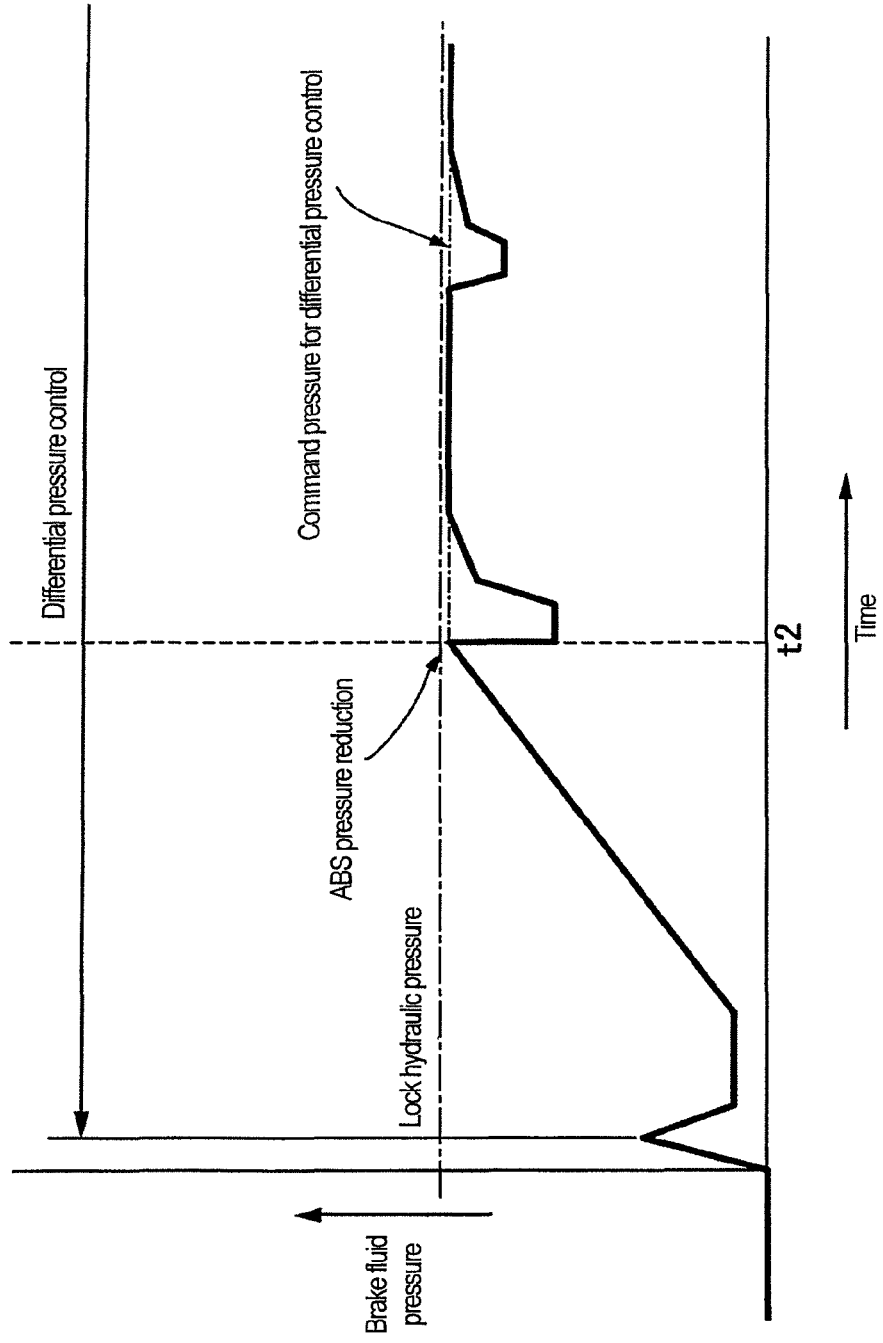
FIG. 12 is a diagram showing a change in brake fluid pressure when reduction in brake fluid pressure of a wheel brake for a front wheel on a high μ side is started due to the antilock braking control near a lock hydraulic pressure at which the antilock braking control is expected to be executed for the wheel brake for the front wheel on the high μ side after the differential pressure control is started.

In this way, in the second embodiment, when the brake fluid pressure of the wheel brake for the front wheel, which is located on the high μ road side when the differential pressure control is started, is started to be decreased in association with the antilock braking control after the differential pressure control is started, the brake fluid pressure of the wheel brake for the front wheel on the high μ road side is controlled so as to become the command pressure while the brake fluid pressure at a time when the reduction of the brake fluid pressure is started is kept to be the command pressure over the second predetermined time period. Thereby, after the differential pressure control is started, the brake fluid pressure of the wheel brake for the front wheel, which is located on the high g road side is controlled to stay, as shown in FIG. 12, near the lock hydraulic pressure at which the antilock braking control is expected to be executed for the wheel brake for the front wheel, which is located on the high μ road side. As a result, the vehicle brake hydraulic pressure control apparatus according to the second embodiment can control the brake fluid pressure of the wheel brake on the high u road side so as not to generate a large change in brake fluid pressure.

Figure 13:
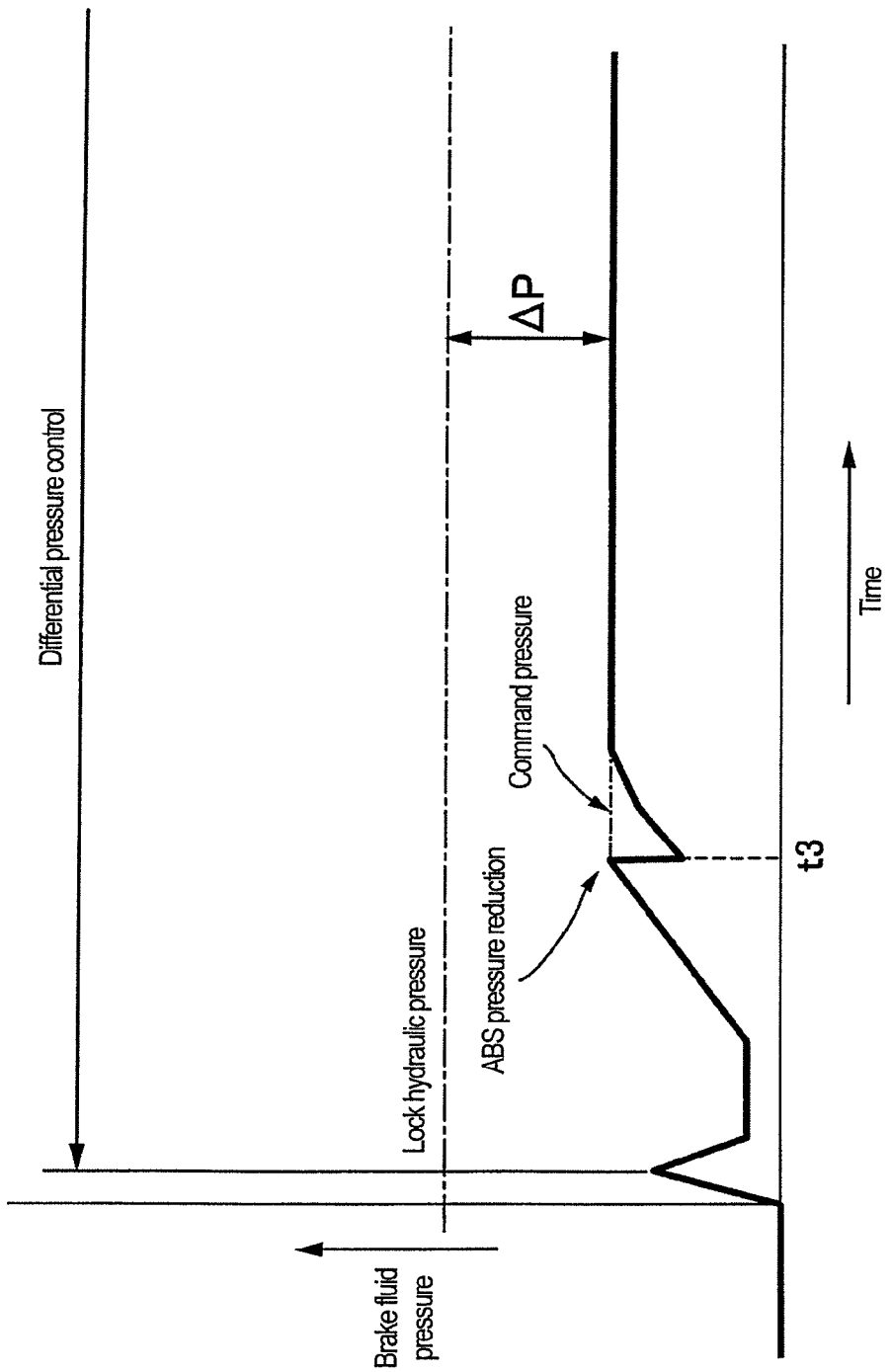
FIG. 13 is a diagram showing a change in brake fluid pressure when reduction in brake fluid pressure of the wheel brake for the front wheel on the high μ side is started due to the antilock braking control at a lower brake fluid pressure than a lock hydraulic pressure at which the antilock braking control is expected to be executed for the wheel brake for the front wheel on the high μ side after the differential pressure control is started.

Incidentally, there may be a case where the brake fluid pressure of the wheel brake for the front wheel, which is located on the high μ road side, is started to be decreased after the differential pressure control is started in association with the antilock braking control, which is triggered by a temporary change in coefficient of friction on the road surface, such as a case where the vehicle passes over irregularities or a cover of a manhole on the road surface, at a time t3 which is before the brake fluid pressure approaches the lock hydraulic pressure at which the antilock braking control is expected to be executed for the wheel brake for the front wheel, which is located on the high μ side road surface, as shown in FIG. 13. In this case, the command pressure after the brake fluid pressure is started to be decreased is set to be lower by ΔP than the lock hydraulic pressure at which the antilock braking control is expected to be executed for the wheel brake for the front wheel, which is located on the high μ road side. This might causes short of a braking force.

Figure 14:
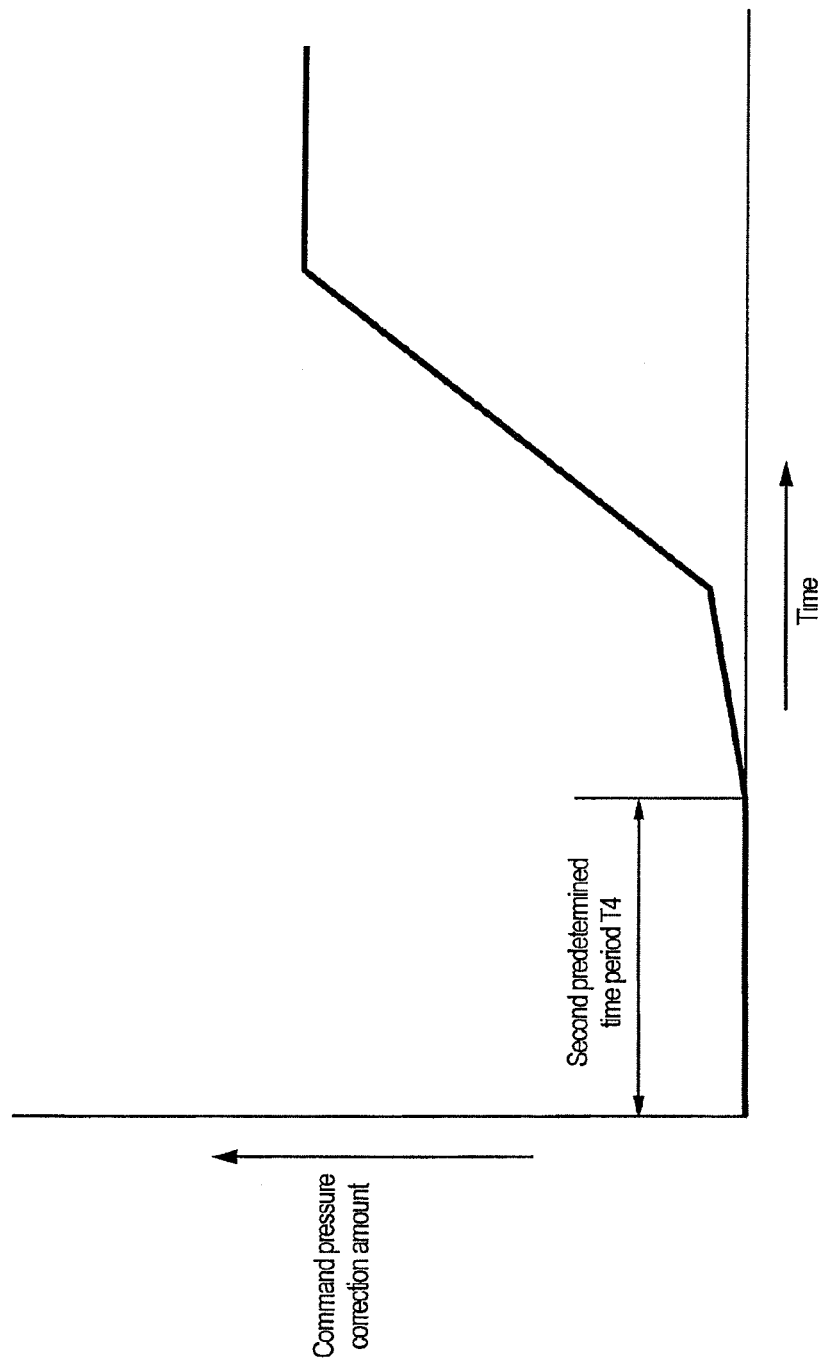
FIG. 14 is a diagram showing a change of command pressure correction amount with time.

Then, in the second embodiment, the differential pressure control section 29 may correct the command pressure based on a command pressure correction amount after the second predetermined time period elapses since the brake fluid pressure is started to be decreased in association with the antilock braking control after the differential pressure control is started. Specifically, the differential pressure control section 29 may acquire a new command pressure by adding the command pressure correction amount to the current command pressure. The command pressure correction amount is set so as to increase step by step with time after the second predetermined time period elapses, as shown in FIG. 14.

Figure 15:
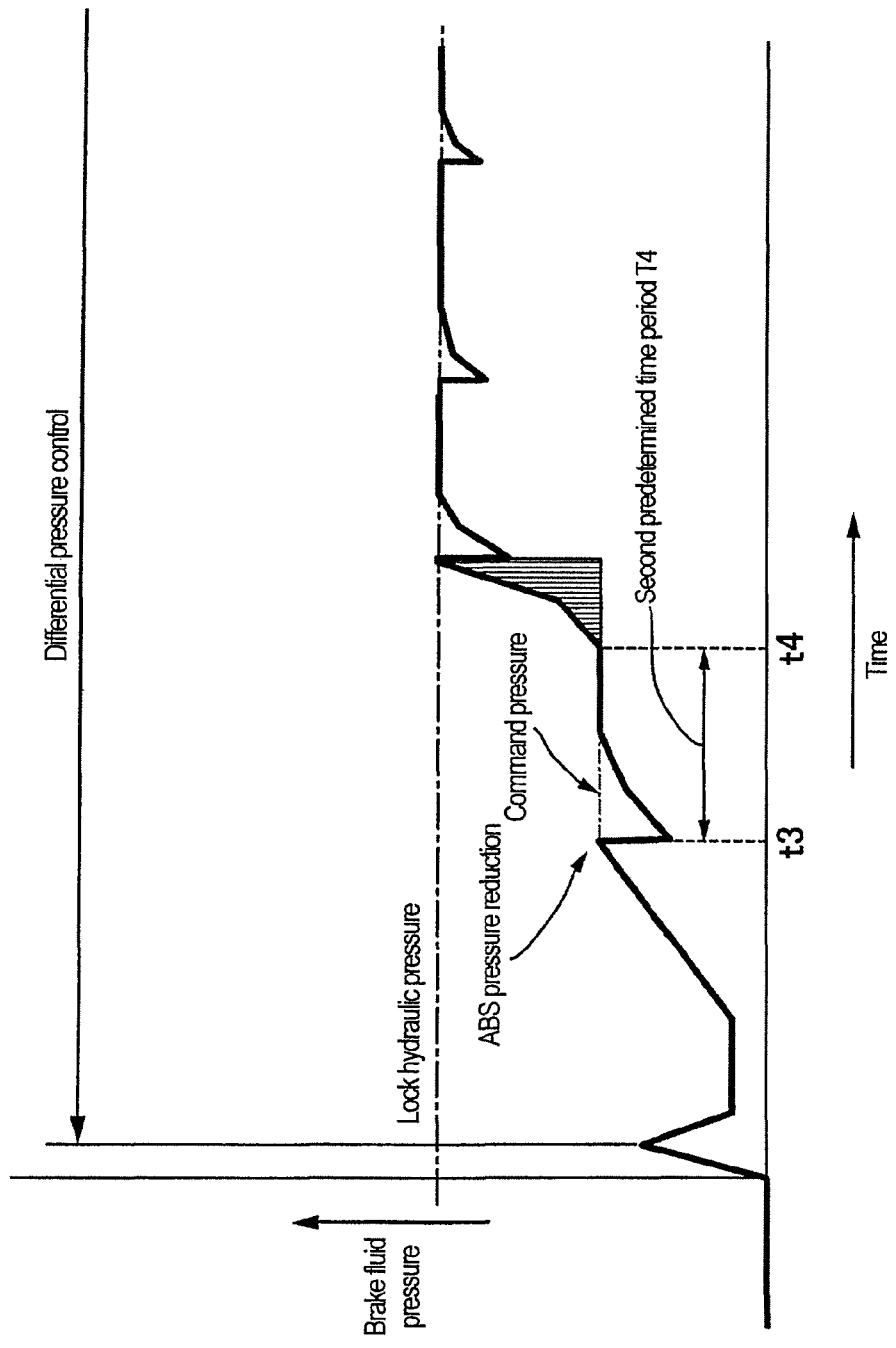
FIG. 15 is a diagram showing a change in brake fluid pressure in the event that a command pressure is corrected based on a command pressure correction amount when reduction in brake fluid pressure of the wheel brake for the front wheel on the high μ side is started due to the antilock braking control at a lower brake fluid pressure than the lock hydraulic pressure at which the antilock braking control is expected to be executed for the wheel brake for the front wheel on the high μ side road surface after the differential pressure control is started.

According to the correction of the command pressure based on the command pressure correction amount in this way, as shown in FIG. 15, the command pressure is increased gradually from the time t4 at which the second predetermined time period T4 elapses since the time t3. As a result, the brake fluid pressure of the wheel brake for the front wheel, which is located on the high μ road side, is restored to the lock hydraulic pressure at which antilock braking control is expected to be executed for the wheel brake for the front wheel, which is located on the high μ road side.

Next, the effect of the second embodiment will be described. When the brake fluid pressure of the wheel brake for the front wheel, which is located on the high μ road side when the differential pressure control is started, is started to be decreased in association with the antilock braking control after the start of differential pressure control, the brake fluid pressure of the wheel brake for the front wheel, which is located on the high μ road side, is controlled to become the command pressure while the brake fluid pressure at a time when the brake fluid pressure is started to be decreased is kept to be the command pressure over the second predetermined time period. Thereby, it is possible to avoid abrupt change in brake fluid pressure due to the antilock braking control. That is, the change in brake fluid pressure can be suppressed. As a result, it is possible to prevent pitching or swaying of the vehicle body.

Also, after the second predetermined time period elapses since the brake fluid pressure is started to be decreased in association with the antilock braking control after the differential pressure control is started, the differential pressure control section 29 may correct the command pressure by adding the command pressure correction amount to the current command pressure. In this case, even in the event that the brake fluid pressure of the wheel brake for the front wheel, which is located on the high μ road side, is started to be decreased in association with the antilock braking control, which is triggered by the temporary change in coefficient of friction on the road surface such as a case where the vehicle passes over the irregularities or the cover of the manhole on the road surface and the brake fluid pressure which is lower than the lock hydraulic pressure at which the antilock braking control is expected to be executed for the wheel brake for the front wheel, which is located on the high μ road side, is set to be the command pressure, it becomes possible to ensure the braking force.

The command pressure correction amount may be set so as to increase step by step with time after the second predetermined time period elapses. In this case, the command pressure is restored to the lock hydraulic pressure at which the antilock braking control is expected to be executed for the wheel brake for the front wheel, which is located on the high μ road side. As a result, it is possible to surely ensure the braking force.

Modified Example 1

The second embodiment has been described premised on the first embodiment. However, the second embodiment is not necessarily premised on the first embodiment. For example, the second embodiment may be modified in the following manner.

That is, a vehicle brake hydraulic pressure control apparatus according to a modified example 1 includes a hydraulic pressure adjusting unit 12, an antilock braking control section 27, a split road determining section 28, a differential pressure control section 29, and a hydraulic pressure adjusting and driving section 31. The hydraulic pressure adjusting unit 12 can individually adjust brake fluid pressures acting on wheel brakes BA to BD for left and right front wheels WA, WB and left and right rear wheels WC, WD. The antilock braking control section 27 determines as to whether or not executing antilock braking control. Also, the antilock braking control section 27 calculates a hydraulic pressure control amount during the execution of the antilock braking control. When the antilock braking control for any of the right and left wheel brakes BA, BB; BC, BD is started, the split road determining section 28 determines as to whether or not road surfaces which the right wheels WB, WD and the left wheels WA, WC are in contact with constitute a split road in which coefficients of friction of the road surfaces are different from each other. In a state where the split road determining section 28 determines that the road surfaces constitute the split road, the differential pressure control section 29 calculates differential pressures between brake fluid pressures of the right and left wheel brakes BA, BB; BC, BD. The hydraulic pressure adjusting and driving section 31 controls the hydraulic pressure adjusting unit 12 based on the determination result by the antilock braking control section 27, the hydraulic pressure control amount calculated by the antilock braking control section 27, and the differential pressures calculated by the differential pressure control section 29. If the brake fluid pressure of the wheel brake, among the wheel brakes BA, BB, being located on a higher coefficient-of-friction road side at a time when the differential pressure control between the wheel brakes BA, BB for the left and right front wheels WA, WB is started decreases in association with the antilock braking control after the differential pressure control is started, the differential pressure control section 29 sets the brake fluid pressure of the wheel brake on the higher coefficient-of-friction road side at a time when the decrease of the brake fluid pressure is started, to the command pressure for the wheel brake on the higher coefficient-of-friction road side. Also, the differential pressure control section 29 continues to output the set command pressure for a second predetermined time period T4. The hydraulic pressure adjusting and driving section 31 drives the hydraulic pressure adjusting unit 12 so that the brake fluid pressure of the wheel brake on the higher coefficient-of-friction road side becomes the set command pressure.

With the configuration of the modified example 1, when the brake fluid pressure of the wheel brake for the front wheel, which is located on the high μ road side when the differential pressure control is started, is started to be decreased in association with the antilock braking control after the differential pressure control is started, the brake fluid pressure of the wheel brake for the front wheel, which is located on the high μ road side, is controlled to become the command pressure while the brake fluid pressure at the time when the brake fluid pressure is started to be decreased is kept to be the command pressure over the predetermined time period. Therefore, it is possible to avoid the abrupt change in brake fluid pressure in association with the antilock braking control. That is, it is possible to suppress the change in brake fluid pressure. As a result, it becomes possible to suppress pitching or swaying of the vehicle body.

Third Embodiment

Next, a third embodiment will be described. It should be noted that similar reference numerals will be assigned to members similar to those of the first and second embodiments and redundant description thereon will be omitted.

It is assumed that in the vehicle brake hydraulic pressure control apparatus according to the first embodiment, the driver further depresses the brake pedal to increase the braking force during the execution of the differential pressure control on the split road. In this case, however, the brake fluid pressures of the wheel brakes do not change, which leads to a possibility that the driver might have physical disorder feeling.

A vehicle brake hydraulic pressure control apparatus according to the third embodiment is configured so as to increase the braking force when the brake pedal is further depressed during the execution of the differential pressure control. Thereby, the driver does not have physical disorder feeling.

The configurations (brake fluid pressure circuit diagrams) of a brake hydraulic pressure control system and a hydraulic pressure adjusting unit 12 according to the third embodiment are similar to those of the first embodiment (see to FIGS. 1 and 2). Therefore, the description thereon will be omitted herein.

Figure 16:
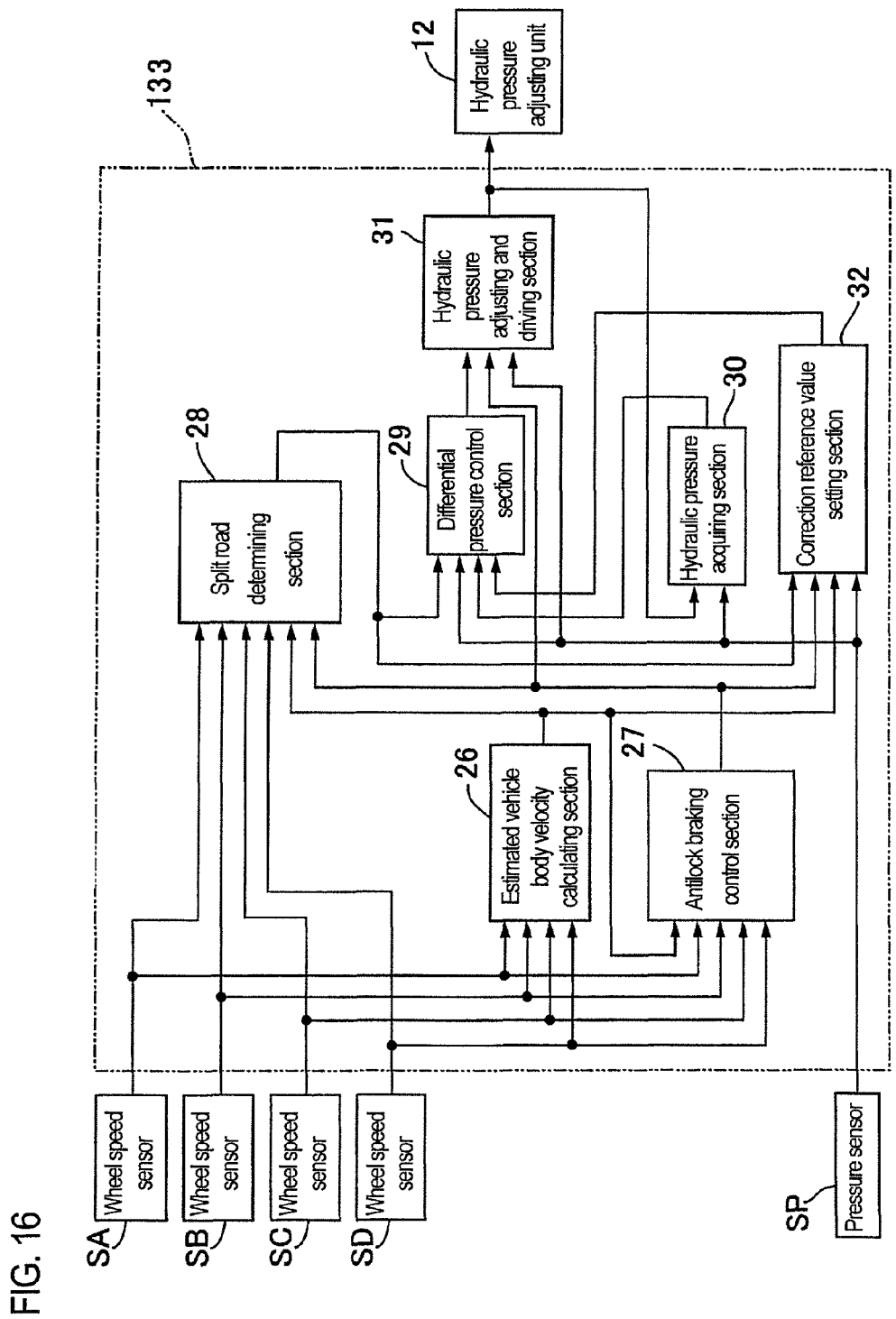
FIG. 16 is a block diagram showing the configuration of a vehicle brake hydraulic pressure control apparatus according to the third embodiment.

FIG. 16 is a block diagram showing the configuration of the vehicle brake hydraulic pressure control apparatus according to the third embodiment. The vehicle brake hydraulic pressure control apparatus according to the third embodiment includes the wheel speed sensors SA to SD, the pressure sensor SP, the hydraulic pressure adjusting unit 12, and the hydraulic pressure control apparatus 133. The vehicle brake hydraulic pressure control apparatus shown in FIG. 16 does not include a steering sensor SS and a yaw rate sensor SY. However, the vehicle brake hydraulic pressure control apparatus according to the third embodiment may include the steering angle sensor SS and the yaw rate sensor SY.

The hydraulic pressure control apparatus 133 includes the estimated vehicle body velocity calculating section 26, the antilock braking control section 27, the split road determining section 28, the differential pressure control section 29, the hydraulic pressure obtaining section 30, the hydraulic pressure adjusting and driving section 31 and a correction reference value setting section 32.

The correction reference value setting section 32 sets a correction reference value based on a detection value of the pressure sensor SP. The correction reference value setting section 32 may perform a filter process for the detection value of the pressure sensor SP and set the correction reference value by adding an offset value to a value obtained by the filter process.

The detection value of the pressure sensor SP, the estimated velocity of the vehicle body calculated by the estimated vehicle body velocity calculating section 26, a signal output from the antilock braking control section 27 which indicates as to whether or not the antilock braking control is being executed, and a signal output from the split road determining section 28 which indicates the result of the determination as to whether or not the road surfaces constitute the split road are input to the correction reference value setting section 32.

Figure 17:
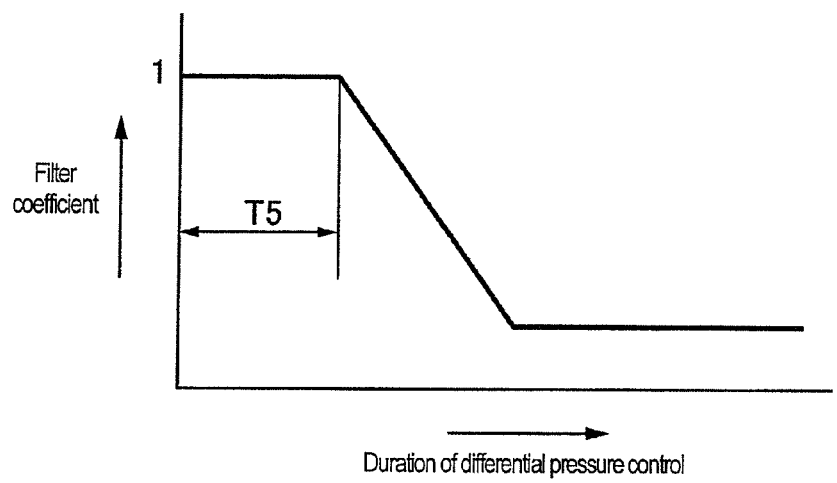
FIG. 17 is a diagram showing a change in filter coefficient which is dependent on a time period during which the differential pressure control continues.
Figure 18:
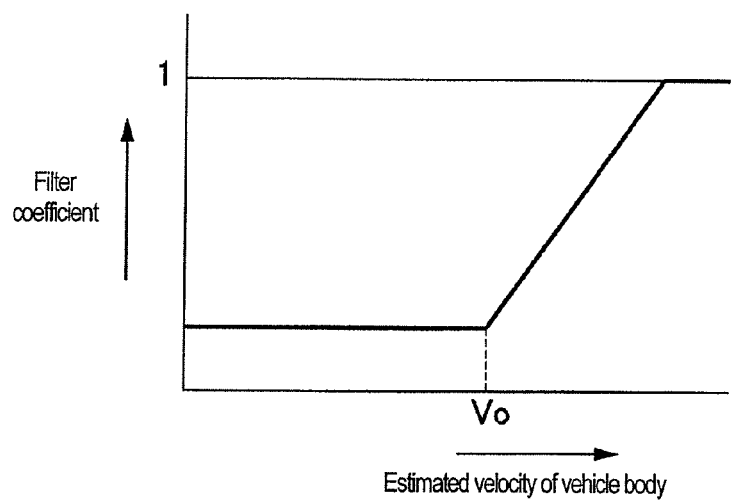
FIG. 18 is a diagram showing a change in filter coefficient which is dependent on the velocity of the vehicle body.
Figure 19:
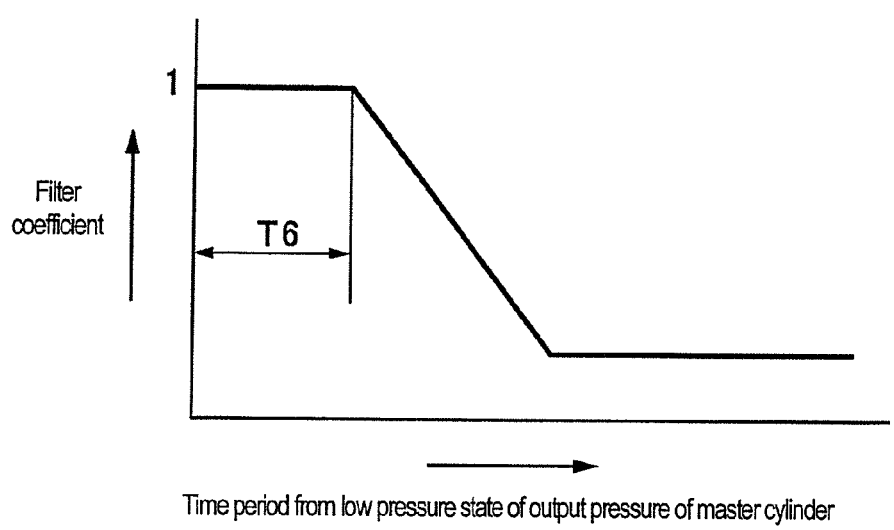
FIG. 19 is a diagram showing a change in filter coefficient which is dependent on a time period that elapses since an output pressure of a master cylinder exceeds a predetermined pressure.

With regard to the filter process performed for the detection value of the pressure sensor SP by the correction reference value setting section 32, a filter coefficient which depends on a time period during which the differential pressure control shown in FIG. 17 continues, a filter coefficient which depends on the velocity of the vehicle body shown in FIG. 18, and a filter coefficient which depends on a time period shown in FIG. 19 which elapses since the output pressure of the master cylinder M exceeds a predetermined pressure are set in advance. The correction reference value setting section 32 executes the filter process using the largest filter coefficient of these filter coefficients.

The filter coefficient shown in FIG. 17 is used so as not to execute a further depression correction in the initial stage of the differential pressure control. In FIG. 17, the filter coefficient is set so as to decrease after a predetermined time period T5 elapses since the differential pressure control is started. Also, the filter coefficient shown in FIG. 18 is used so as not to execute the further depression correction in a state where the vehicle is running at high speeds. In FIG. 18, the filter coefficient is set so as to increase after the estimated velocity of the vehicle body reaches a predetermined velocity Vo. Furthermore, the filter coefficient shown in FIG. 19 is used so as not to execute the further depression correction in a state that the output pressure from the master cylinder M is low. In FIG. 19, the filter coefficient is set so as to decrease after a predetermined time period T6 elapses since the output hydraulic pressure from the master cylinder M reaches a predetermined low pressure.

The differential pressure control section 29 determines, based on the detection value of the pressure sensor SP, as to whether or not the brake pedal 11 has been further depressed. When determining that the brake pedal 11 has been further depressed, the differential pressure control section 29 adds a part of an amount by which the detection value of the pressure sensor SP exceeds the correction reference value set by the correction reference value setting section 32 to the command pressure, in a non-further depression operation state, for the brake fluid pressures of the wheel brakes on a high coefficient-of-friction road side and determines the brake fluid pressures obtained by the adding to be the command pressures in a further depression operation state. More specifically, the differential pressure control section 29 multiplies by a factor less than "1" the amount by which the detection value of the pressure sensor SP exceeds the correction reference value, adds the value obtained by the multiplication to the command pressures, in the non-further depression operation state, for the brake fluid pressures of the wheel brakes on the high coefficient-of-friction road side and determines the brake fluid pressures obtained by the adding to be the command pressures in the further depression operation state.

Figure 20:
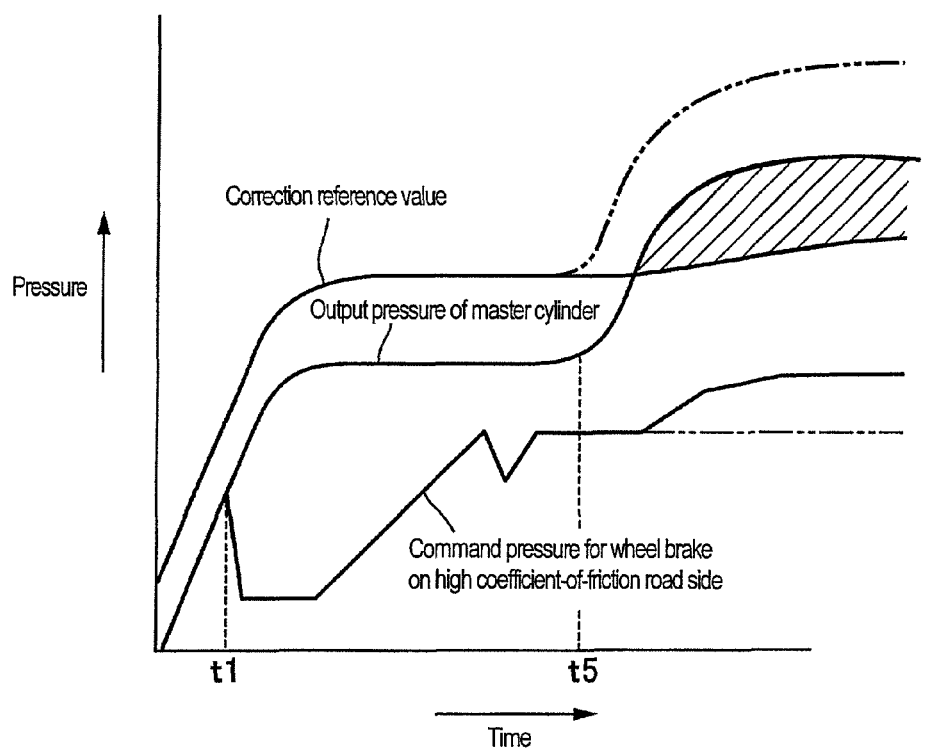
FIG. 20 is a diagram showing changes with time of the brake fluid pressure of the wheel brake on the high coefficient-of-friction side, the output pressure of the master cylinder, and a correction reference value.

Here, FIG. 20 shows examples of changes with time of the command pressure for the brake fluid pressure of the wheel brake on the high coefficient-of-friction road side, the output pressure from the master cylinder M, and the correction reference value, after the differential pressure control is started. It is assumed that the brake pedal 11 is further depressed at a time t5 which is after a time t1 when the differential pressure control is started. Then, the output pressure of the master cylinder M is increased drastically from the time t5. However, the correction reference value is obtained by performing the filter process for the detection value of the pressure sensor SP, which detects the output pressure from the master cylinder M and by adding the offset value to the value obtained by the filter process. Therefore, the correction reference value changes moderately without following the change in output pressure of the master cylinder M. Then, a value obtained by multiplying by the factor less than "1" a portion shaded with oblique lines and lying between the output pressure of the master cylinder M and the correction reference value in FIG. 20 is added to the command pressure (a straight line indicated by a chain line in FIG. 20), in the non-further depression operation state, for the brake fluid pressure of the wheel brake on the high coefficient-of-friction road side. Thereby, the command pressure, in the further depression operation state, for the brake fluid pressure of the wheel brake on the high coefficient-of-friction road side is increased to a value indicated by a solid line.

Next, the effect of the third embodiment will be described. When recognizing based on the change in detection value of the pressure sensor SP that the brake pedal 11 is further depressed during the execution of the differential pressure control, the differential pressure control section 29 adds a part of the amount by which the detection value of the pressure sensor SP exceeds the correction reference value to the command pressure, in the non-further depression operation state, for the brake fluid pressure of the wheel brake on the high coefficient-of-friction road side and determines the value obtained by the adding to be the command pressure, in the further depression operation state, for the brake fluid pressure of the wheel brake on the high coefficient-of-friction road side. Therefore, the braking force can be increased by increasing the brake fluid pressure of the wheel brake on the high coefficient-of-friction road side in response to the further depression operation of the brake pedal 11. As a result, it is possible to prevent the driver from having physical disorder feeling.

Also, the correction reference value is set by performing the filter process for the detection value of the pressure sensor SP and adding the offset value to the value obtained by the filter process. Therefore, the brake fluid pressure is not increased in association with the further depression operation of the brake pedal 11 unless the detection value of the pressure sensor SP changes largely towards a pressure increasing side to some extent. As a result, it is possible to prevent a further depression correction from being executed unless the driver has a strong intention to brake the vehicle.

Modified Example 2

The third embodiment has been described premised on the first embodiment. However, the third embodiment is not necessarily premised on the first embodiment. For example, the third embodiment may be modified in the following manner.

A vehicle brake hydraulic pressure control apparatus according to a second modified example includes a master cylinder M, a hydraulic pressure adjusting unit 12, a split road determining section 28, a differential pressure control section 29, a hydraulic pressure adjusting and driving section 31, a pressure sensor SP, and a correction reference value setting section 32. The master cylinder M outputs a hydraulic pressure in response to an operation amount of a brake pedal 11 by a driver. The hydraulic pressure adjusting unit 12 can individually adjust brake fluid pressures acting on wheel brakes BA, BB; BC, BD for left and right front wheels WA, WB and left and right rear wheels WC, WD. The hydraulic pressure adjusting unit 12 is provided between the master cylinder M and the wheel brakes BA, BB; BC, BD. The split road determining section 28 determines as to whether or not road surfaces which the right wheels WB, WD and the left wheels WA, WC are in contact with constitute a split road in which coefficients of friction of the road surfaces are different from each other. In a state where the split road determining section 28 determines during execution of antilock braking control that the road surfaces constitute the split road, the differential pressure control section 29 calculates differential pressures between the brake fluid pressures of the right and left wheel brakes BA, BB; BC. BD so that the brake fluid pressure of each wheel brake on a higher coefficient-of-friction road side is larger than that of the corresponding wheel brake on a lower coefficient-of-friction road side. The hydraulic pressure adjusting and driving section 31 drives the hydraulic pressure adjusting unit 12 in accordance with the calculation result by the differential control section 29. The pressure sensor SP detects the output pressure of the master cylinder M. The correction reference value setting section 32 sets a correction reference value based on the detected value by the pressure sensor SP. If the differential pressure control section 29 determines based on the detected value by the pressure sensor SP that a further depression operation is performed for the brake pedal 11, the differential pressure control section 29 adds a part of an amount by which the output pressure of the master cylinder M detected by the pressure sensor SP exceeds the correction reference value set by the correction reference value setting section 32 to command pressures, in a non-further depression operation state, for the wheel brakes on the higher coefficient-of-friction road side and determines brake fluid pressures obtained by the adding to be command pressures, in a further depression operation state, for the wheel brakes on the higher coefficient-of-friction road side.

Thus, while the embodiments of the invention have been described heretofore, the invention is not limited thereto. Various design modifications may be made for the embodiments without departing from the inventions described in claims.

What is claimed is:

1. A vehicle brake hydraulic pressure control apparatus comprising:
   a hydraulic pressure adjusting unit that individually adjusts brake fluid pressures acting on wheel brakes for right and left front wheels and right and left rear wheels;
   a split road determining section that determines as to whether or not road surfaces which the right wheels and the left wheels are in contact with constitute a split road in which coefficients of friction of the road surfaces are different from each other;
   a differential pressure control section that, in a state where the split road determining section determines during execution of antilock braking control that the road surfaces constitute the split road, determines command pressures for the right and left wheel brakes so that differential pressures between the brake fluid pressures of the right and left wheel brakes are equal to or less than a permissible differential pressure; and
   a hydraulic pressure adjusting and driving section that controls the hydraulic pressure adjusting unit based on the command pressures determined by the differential pressure control section, wherein
   the differential pressure control section sets a permissible differential pressure from start of differential pressure control until elapse of a first predetermined time period to be smaller than that after the elapse of the first predetermined time period, and
   the permissible differential pressure is increased after the elapse of the first predetermined time period, and
   the timing at which the differential pressure is increased is determined based on the first predetermined time period without depending on operating speed of a brake pedal and operating amount of the brake pedal.

2. The apparatus according to claim 1, further comprising:
a vehicle body velocity acquiring section that acquires a velocity of a vehicle body, wherein
the differential pressure control section sets the permissible differential pressure from the start of the differential pressure control until the elapse of the first predetermined time period, based on the velocity of the vehicle body acquired by the vehicle body velocity acquiring section.

3. The apparatus according to claim 1, further comprising:
a vehicle body velocity acquiring section that acquires a velocity of a vehicle body, wherein
the differential pressure control section sets the permissible differential pressure from the start of the differential pressure control until the elapse of the first predetermined time period so that the permissible differential pressure increases as the velocity of the vehicle body acquired by the vehicle body velocity acquiring section decreases.

4. The apparatus according to claim 2, wherein the differential pressure control section searches for the permissible differential pressure from the start of the differential pressure control until the elapse of the first predetermined time period, based on a map in which the permissible differential pressure is determined in response to the velocity of the vehicle body in advance.

5. The apparatus according to claim 3, wherein the differential pressure control section searches for the permissible differential pressure from the start of the differential pressure control until the elapse of the first predetermined time period, based on a map in which the permissible differential pressure is determined in response to the velocity of the vehicle body in advance.

6. The apparatus according to claim 1, further comprising:
a steering angle sensor that detects a steering angle; and
a yaw rate sensor that detects a yaw rate of a vehicle, wherein
the differential pressure control section sets the permissible differential pressure after the elapse of the first predetermined time period since the start of the differential pressure control, based on the steering angle detected by the steering angle sensor and the yaw rate detected by the yaw rate sensor.

7. The apparatus according to claim 2, further comprising:
a steering angle sensor that detects a steering angle; and
a yaw rate sensor that detects a yaw rate of a vehicle, wherein
the differential pressure control section sets the permissible differential pressure after the elapse of the first predetermined time period since the start of the differential pressure control, based on the steering angle detected by the steering angle sensor and the yaw rate detected by the yaw rate sensor.

8. The apparatus according to claim 3, further comprising:
a steering angle sensor that detects a steering angle; and
a yaw rate sensor that detects a yaw rate of a vehicle, wherein
the differential pressure control section sets the permissible differential pressure after the elapse of the first predetermined time period since the start of the differential pressure control, based on the steering angle detected by the steering angle sensor and the yaw rate detected by the yaw rate sensor.

9. The apparatus according to claim 1, further comprising:
an antilock braking control section that determines as to whether or not executing the antilock braking control, and that calculates a hydraulic pressure control amount during the execution of the antilock braking control, wherein
in the state where the split road determining section determines that the road surfaces constitute the split road, the differential pressure control section calculates the differential pressures between the brake fluid pressures of the right and left wheel brakes,
the hydraulic pressure adjusting and driving section controls the hydraulic pressure adjusting unit based on the hydraulic pressure control amount calculated by the antilock braking control section and the differential pressures calculated by the differential pressure control section,
if the brake fluid pressure of the wheel brake, among the wheel brakes for the right and left front wheels, being located on a higher coefficient-of-friction road side at a time when the differential pressure control between the wheel brakes for the right and left front wheels is started decreases in association with the antilock braking control after the differential pressure control is started, the differential pressure control section determines the brake fluid pressure of the wheel brake on the higher coefficient-of-friction road side at a time when the decrease of the brake fluid pressure is started, to be the command pressure for the wheel brake on the higher coefficient-of-friction road side,
the differential pressure control section continues to output the determined command pressure for the wheel brake on the higher coefficient-of-friction road side for a second predetermined time period, and
the hydraulic pressure adjusting and driving section controls the hydraulic pressure adjusting unit so that the brake fluid pressure of the wheel brake on the higher coefficient-of-friction road side becomes the determined command pressure for the wheel brake on the higher coefficient-of-friction road side.

10. The apparatus according to claim 2, further comprising:
an antilock braking control section that determines as to whether or not executing the antilock braking control, and that calculates a hydraulic pressure control amount, wherein
in the state where the split road determining section determines that the road surfaces constitute the split road, the differential pressure control section calculates the differential pressure between the brake fluid pressures of the right and left wheel brakes,
the hydraulic pressure adjusting and driving section controls the hydraulic pressure adjusting unit based on the hydraulic pressure control amount calculated by the antilock braking control section and the differential pressure calculated by the differential pressure control section,
if the brake fluid pressure of the wheel brake, among the wheel brakes for the right and left front wheels, being located on a higher coefficient-of-friction road side at a time when the differential pressure control between the wheel brakes for the right and left front wheels is started decreases in association with the antilock braking control after the differential pressure control is started, the differential pressure control section determines the brake fluid pressure of the wheel brake on the higher coefficient-of-friction road side at a time when the decrease of the brake fluid pressure is started, to be the command pressure for the wheel brake on the higher coefficient-of-friction road side, the differential pressure control section continues to output the determined command pressure for the wheel brake on the higher coefficient-of-friction road side for a second predetermined time period, and the hydraulic pressure adjusting and driving section controls the hydraulic pressure adjusting unit so that the brake fluid pressure of the wheel brake on the higher coefficient-of-friction road side becomes the determined command pressure for the wheel brake on the higher coefficient-of-friction road side.

11. The apparatus according to claim 3, further comprising:

an antilock braking control section that determines as to whether or not executing the antilock braking control, and that calculates a hydraulic pressure control amount, wherein in the state where the split road determining section determines that the road surfaces constitute the split road, the differential pressure control section calculates the differential pressure between the brake fluid pressures of the right and left wheel brakes, the hydraulic pressure adjusting and driving section controls the hydraulic pressure adjusting unit based on the hydraulic pressure control amount calculated by the antilock braking control section and the differential pressure calculated by the differential pressure control section, if the brake fluid pressure of the wheel brake, among the wheel brakes for the right and left front wheels, being located on a higher coefficient-of-friction road side at a time when the differential pressure control between the wheel brakes for the right and left front wheels is started decreases in association with the antilock braking control after the differential pressure control is started, the differential pressure control section determines the brake fluid pressure of the wheel brake on the higher coefficient-of-friction road side at a time when the decrease of the brake fluid pressure is started, to be the command pressure for the wheel brake on the higher coefficient-of-friction road side, the differential pressure control section continues to output the determined command pressure for the wheel brake on the higher coefficient-of-friction road side for a second predetermined time period, and the hydraulic pressure adjusting and driving section controls the hydraulic pressure adjusting unit so that the brake fluid pressure of the wheel brake on the higher coefficient-of-friction road side becomes the determined command pressure for the wheel brake on the higher coefficient-of-friction road side.

12. The apparatus according to claim 9, wherein after the second predetermined time period has been elapsed since the decrease of the brake fluid pressure by the antilock braking control is started after the differential pressure control is started, the differential pressure control section corrects the command pressure for the wheel brake on the higher coefficient-of-friction road side based on a command pressure correction amount so as to increase the command pressure for the wheel brake on the higher coefficient-of-friction road side.

13. The apparatus according to claim 9, wherein after the second predetermined time period has been elapsed since the decrease of the brake fluid pressure by the antilock braking control is started after the differential pressure control is started, the differential pressure control section corrects the command pressure for the wheel brake on the higher coefficient-of-friction road side by adding a command pressure correction amount to a current command pressure for the wheel brake on the higher coefficient-of-friction road side.

14. The apparatus according to claim 12, wherein the command pressure correction amount is set so as to subsequently increase with time after the second predetermined time period has been elapsed.

15. The apparatus according to claim 1, further comprising:

a master cylinder that outputs a hydraulic pressure in response to the operation amount of the brake pedal by a driver;

a pressure sensor that detects the output pressure of the master cylinder, and a correction reference value setting section that sets a correction reference value based on the detected value by the pressure sensor, wherein in the state where the split road determining section determines during the execution of the antilock braking control that the road surfaces constitute the split road, the differential pressure control section calculates the differential pressures between the brake fluid pressures of the right and left wheel brakes so that the brake fluid pressure of each wheel brake on a higher coefficient-of-friction road side is larger than that of the corresponding wheel brake on a lower coefficient-of-friction road side, and after the elapse of the first predetermined time period, if the differential pressure control section determines based on the detected value by the pressure sensor that a further depression operation is performed for the brake pedal, the differential pressure control section adds a part of an amount by which the output pressure of the master cylinder detected by the pressure sensor exceeds the correction reference value set by the correction reference value setting section to command pressures, in a non-further depression operation state, for the wheel brakes on the higher coefficient-of-friction road side and determines brake fluid pressures obtained by the adding to be the command pressures, in a further depression operation state, for the wheel brakes on the higher coefficient-of-friction road side.

16. The apparatus according to claim 2, further comprising:

a master cylinder that outputs a hydraulic pressure in response to the operation amount of the brake pedal by a driver;

a pressure sensor that detects the output pressure of the master cylinder, and a correction reference value setting section that sets a correction reference value based on the detected value by the pressure sensor, wherein in the state where the split road determining section determines during the execution of the antilock braking control that the road surfaces constitute the split road, the differential pressure control section calculates the differential pressures between the brake fluid pressures of the right and left wheel brakes so that the brake fluid pressure of each wheel brake on a higher coefficient-of-friction road side is larger than that of the corresponding wheel brake on a lower coefficient-of-friction road side, and after the elapse of the first predetermined time period, if the differential pressure control section determines based on the detected value by the pressure sensor that a further depression operation is performed for the brake pedal, the differential pressure control section adds a part of an amount by which the output pressure of the master cylinder detected by the pressure sensor exceeds the correction reference value set by the correction reference value setting section to command pressures, in a non-further depression operation state, for the wheel brakes on the higher coefficient-of-friction road side and determines brake fluid pressures obtained by the adding to be the command pressures, in a further depression operation state, for the wheel brakes on the higher coefficient-of-friction road side.

17. The apparatus according to claim 3, further comprising:
a master cylinder that outputs a hydraulic pressure in response to the operation amount of the brake pedal by a driver;
a pressure sensor that detects the output pressure of the master cylinder, and
a correction reference value setting section that sets a correction reference value based on the detected value by the pressure sensor, wherein
in the state where the split road determining section determines during the execution of the antilock braking control that the road surfaces constitute the split road, the differential pressure control section calculates the differential pressures between the brake fluid pressures of the right and left wheel brakes so that the brake fluid pressure of each wheel brake on a higher coefficient-of-friction road side is larger than that of the corresponding wheel brake on a lower coefficient-of-friction road side, and after the elapse of the first predetermined time period, if the differential pressure control section determines based on the detected value by the pressure sensor that a further depression operation is performed for the brake pedal, the differential pressure control section adds a part of an amount by which the output pressure of the master cylinder detected by the pressure sensor exceeds the correction reference value set by the correction reference value setting section to command pressures, in a non-further depression operation state, for the wheel brakes on the higher coefficient-of-friction road side and determines brake fluid pressures obtained by the adding to be the command pressures, in a further depression operation state, for the wheel brakes on the higher coefficient-of-friction road side.

18. The apparatus according to claim 15, wherein the correction reference value setting section performs a filter process for the detected value by the pressure sensor and sets the correction reference value by adding an offset value to a value obtained by the filter process.

19. The apparatus according to claim 1, wherein:
regardless of the operating speed of the brake pedal and operating amount of the brake pedal, the timing at which the difference between the brake fluid pressure on the high coefficient-of-friction side and the brake fluid pressure on the low coefficient-of-friction side is increased is a point in time when the first predetermined time period elapses since a time at which the differential pressure control is started.

* * * * *